(12) United States Patent
Liu et al.

(10) Patent No.: US 12,136,876 B2
(45) Date of Patent: *Nov. 5, 2024

(54) SWITCHED CAPACITOR VOLTAGE CONVERTER CIRCUIT

(71) Applicant: Richtek Technology Corporation, Zhubei (TW)

(72) Inventors: Kuo-Chi Liu, Hsinchu (TW); Ta-Yung Yang, Taoyuan (TW)

(73) Assignee: RICHTEK TECHNOLOGY CORPORATION, Zhubei (TW)

(*) Notice: Subject to any disclaimer, the term of this patent is extended or adjusted under 35 U.S.C. 154(b) by 220 days.

This patent is subject to a terminal disclaimer.

(21) Appl. No.: 18/065,205

(22) Filed: Dec. 13, 2022

(65) Prior Publication Data
US 2023/0223843 A1 Jul. 13, 2023

Related U.S. Application Data

(60) Provisional application No. 63/298,302, filed on Jan. 11, 2022.

(30) Foreign Application Priority Data

Jun. 14, 2022 (TW) ................................ 111121940

(51) Int. Cl.
H02M 3/07 (2006.01)
H02M 1/00 (2006.01)
H02M 3/158 (2006.01)

(52) U.S. Cl.
CPC ............ H02M 3/07 (2013.01); H02M 1/0058 (2021.05); H02M 3/158 (2013.01)

(58) Field of Classification Search
CPC ...... H02M 3/07; H02M 1/0009; H02M 3/015; H02M 1/0095; H02M 1/10; H02M 1/0058; H02M 3/158; H02M 1/083; H02M 3/157; H02M 3/1584; Y02B 70/10
See application file for complete search history.

(56) References Cited

U.S. PATENT DOCUMENTS

| 5,558,071 | A | * | 9/1996 | Ward | H01F 38/12 123/598 |
| 8,351,228 | B2 | * | 1/2013 | Izumi | H02M 3/07 363/60 |
| 9,654,003 | B1 | * | 5/2017 | LaBella | H02M 3/158 |
| 9,667,139 | B2 | * | 5/2017 | Giuliano | H02M 3/158 |
| 9,831,776 | B1 | * | 11/2017 | Jiang | H02M 1/15 |

(Continued)

Primary Examiner — Yusef A Ahmed
(74) Attorney, Agent, or Firm — Tung & Associates

(57) ABSTRACT

A switched capacitor voltage converter circuit includes: a switched capacitor converter, a control circuit and a zero current estimation circuit. The switched capacitor converter includes at least one resonant capacitor, switches and at least one inductor. The zero current estimation circuit is coupled to the at least one inductor and/or the at least one resonant capacitor, for estimating a time point at which a first resonant current is zero during a first process and/or a time point at which a second resonant current is zero during a second process according to a voltage difference between two ends of the inductor, and/or a voltage difference between two ends of the resonant capacitor, to a generate a zero current estimation signal accordingly for generating the operation signal.

22 Claims, 19 Drawing Sheets

(56) References Cited

U.S. PATENT DOCUMENTS

| | | | |
|---|---|---|---|
| 9,917,517 B1* | 3/2018 | Jiang | H02M 1/34 |
| 10,063,146 B1* | 8/2018 | Lee | G01R 19/003 |
| 10,122,256 B1 | 11/2018 | Babazadeh et al. | |
| 10,651,731 B1* | 5/2020 | Rainer | H02M 3/1588 |
| 11,011,991 B1* | 5/2021 | Mercer | H02M 1/15 |
| 11,165,335 B2* | 11/2021 | Sblano | H02M 3/1584 |
| 2007/0018618 A1* | 1/2007 | Endo | H02M 3/1588 |
| | | | 323/224 |
| 2008/0055946 A1* | 3/2008 | Lesso | H02M 3/1582 |
| | | | 363/63 |
| 2008/0252277 A1* | 10/2008 | Sase | H02M 3/157 |
| | | | 323/283 |
| 2010/0026262 A1* | 2/2010 | Sase | H02M 3/156 |
| | | | 323/283 |
| 2011/0175591 A1* | 7/2011 | Cuk | H02M 3/158 |
| | | | 323/311 |
| 2013/0314067 A1* | 11/2013 | Matzberger | H02M 3/1588 |
| | | | 323/311 |
| 2017/0110973 A1* | 4/2017 | Chen | H03L 7/00 |
| 2017/0187290 A1* | 6/2017 | Li | H02M 3/1582 |
| 2019/0028025 A1* | 1/2019 | Babazadeh | H01L 27/088 |
| 2019/0044430 A1* | 2/2019 | Moon | H02M 3/3376 |
| 2019/0081546 A1* | 3/2019 | Hsu | H02M 3/158 |
| 2020/0177081 A1* | 6/2020 | Huang | H02M 3/07 |
| 2020/0204071 A1* | 6/2020 | Huang | H02M 3/07 |
| 2021/0175805 A1* | 6/2021 | Mercer | H02M 1/08 |
| 2021/0211048 A1* | 7/2021 | Yu | H02M 1/0029 |
| 2021/0288581 A1* | 9/2021 | Zhu | H02M 3/07 |
| 2021/0328507 A1* | 10/2021 | Liu | H02M 1/0095 |
| 2021/0351695 A1* | 11/2021 | Liu | H02M 3/155 |
| 2021/0367511 A1* | 11/2021 | Liu | H02M 3/01 |
| 2021/0367520 A1* | 11/2021 | Liu | H02M 3/158 |
| 2021/0376717 A1* | 12/2021 | Liu | H02M 3/01 |
| 2021/0384820 A1* | 12/2021 | Liu | H02M 1/007 |
| 2021/0399621 A1* | 12/2021 | Liu | H02M 3/01 |
| 2022/0029531 A1* | 1/2022 | Liu | H02M 3/01 |
| 2022/0140726 A1* | 5/2022 | Liu | H02M 1/0095 |
| | | | 323/271 |
| 2022/0352816 A1* | 11/2022 | Liu | H02M 3/07 |
| 2022/0368218 A1* | 11/2022 | Liu | H02M 3/01 |
| 2023/0028873 A1* | 1/2023 | Liu | H02M 3/07 |
| 2023/0148139 A1* | 5/2023 | Chang | H02M 1/4225 |
| | | | 363/84 |
| 2023/0170795 A1* | 6/2023 | Yoo | H02M 1/08 |
| | | | 323/271 |
| 2023/0179093 A1* | 6/2023 | Liu | H02M 1/0058 |
| | | | 323/271 |
| 2023/0223843 A1* | 7/2023 | Liu | H02M 1/083 |
| | | | 363/21.02 |
| 2023/0246548 A1* | 8/2023 | Liu | H02M 3/07 |
| | | | 323/271 |
| 2023/0361674 A1* | 11/2023 | Liu | H02M 3/158 |
| 2023/0396162 A1* | 12/2023 | Liu | H02M 1/0095 |
| 2023/0412073 A1* | 12/2023 | Ge | H02M 3/077 |
| 2024/0072633 A1* | 2/2024 | Liu | H02M 3/07 |
| 2024/0235370 A1* | 7/2024 | Liu | H02M 1/0095 |
| 2024/0297580 A1* | 9/2024 | Liu | H02M 3/07 |

* cited by examiner

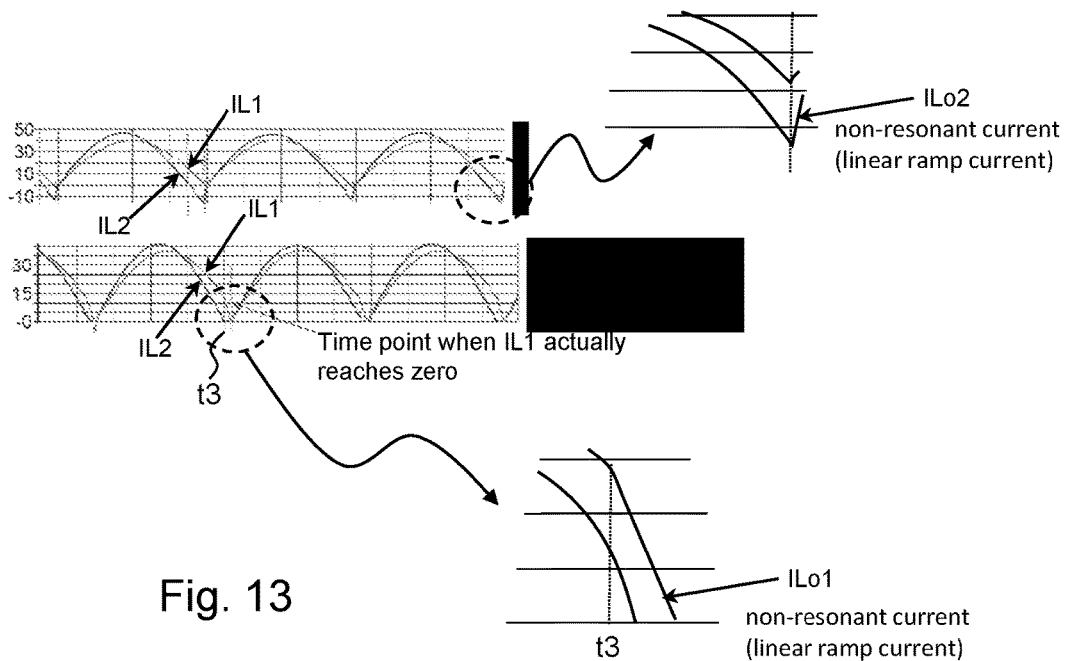
Fig. 13
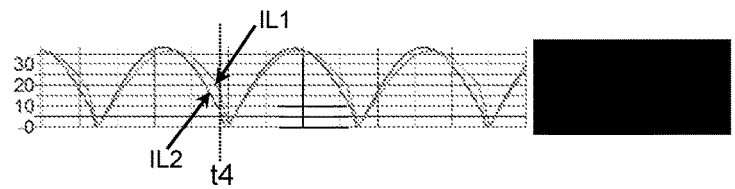
Fig. 14
|  | IL1 (rms) | IL2 (rms) | IC3 (rms) | IC2 (rms) | ON power loss (IC2 at 10m Ohm) | % |
|---|---|---|---|---|---|---|
| Condition 1 | 27.744 A | 27.762 A | 27.744 A | 27.762 A | 7.707 W | 100% |
| Condition 2 | 27.527 A | 30.057 A | 27.527 A | 30.035 A | 9.021 W | 117.0% |
| Condition 3 | 27.684 A | 29.278 A | 27.683 A | 29.278 A | 8.572 W | 111.2% |
| Condition 4 | 26.977 A | 27.759 A | 26.939 A | 27.759 A | 7.706 W | 100.0% |
| Condition 5 | 26.692 A | 26.512 A | 26.511 A | 26.503 A | 7.024 W | 91.1% |
Fig. 15

SWITCHED CAPACITOR VOLTAGE CONVERTER CIRCUIT

CROSS REFERENCE

The present invention claims priority to U.S. 63/298,302 filed on Jan. 11, 2022 and claims priority to TW 111121940 filed on Jun. 14, 2022.

BACKGROUND OF THE INVENTION

Field of Invention

The present invention relates to a switched capacitor voltage converter circuit; particularly, it relates to such switched capacitor voltage converter circuit capable of estimating a zero current time point and capable of switching the switches at a time point which is not later than the zero current time point.

Description of Related Art

Please refer to FIG. 1, which shows a schematic block diagram of a conventional power converter. This conventional power converter 10 senses a voltage at a node between a switch Q5 and a switch Q6 by a zero current estimation circuit 101, and senses a voltage at a node between a switch Q9 and a switch Q10 by a zero current estimation circuit 102. The prior art shown in FIG. 1 a drawback that the zero current estimation is not very precise; the inaccuracy is due to that there is a delay between the gate control signal issued by a digital controller to control a switch and the actual turned-OFF time of the switch.

In view of the above, to overcome the drawback in the prior art, the present invention proposes an innovative switched capacitor voltage converter circuit.

SUMMARY OF THE INVENTION

From one perspective, the present invention provides a switched capacitor voltage converter circuit configured to convert a first voltage into a second voltage or to convert the second voltage into the first voltage, the switched capacitor voltage converter circuit comprising: a switched capacitor converter coupled between the first voltage and second voltage; a control circuit configured to generate a control signal for controlling the switched capacitor converter to convert the first voltage to the second voltage or to convert the second voltage to first voltage; and a zero current estimation circuit, which is coupled to the switched capacitor converter; wherein the switched capacitor converter includes: at least one resonant capacitor; a plurality of switches coupled to the at least one resonant capacitor; and at least one inductor; wherein the zero current estimation circuit is coupled to the at least one inductor and/or the at least one resonant capacitor and the zero current estimation circuit is configured to operably estimate a time point at which a first resonant current is zero during a first process and/or estimate a time point at which at least one second resonant current is zero during at least one second process according to a voltage difference across two ends of the inductor and/or according to a voltage difference across two ends of the resonant capacitor, so as to correspondingly generate a zero current estimation signal at a time point which is not later than the time point at which the first resonant current is zero and/or at a time point which is not later than the time point at which the at least one second resonant current is zero, and the control signal is generated according to the zero current estimation signal; wherein the control signal generated by the control circuit includes: a first operation signal and at least one second operation signal; wherein, in the first process, the first operation signal controls the first switches, so that the at least one resonant capacitor and a corresponding one of the at least one inductor are connected in series between the first voltage and second voltage, to form a first current path and to operate in resonant operation; wherein, in the at least one second process, the second operation signal controls the second switches, so that the at least one resonant capacitor and the corresponding inductor are connected in series between the second voltage and a DC potential, to simultaneously form or sequentially form a plurality of second current paths and operate in resonant operation; wherein the first operation signals and the at least one second operation signals have respective ON periods which do not overlap one another, so that the first resonant process and the at least one second resonant process do not overlap each other; wherein the first process and the at least one second process are performed in a repeated, alternating manner, so as to convert the first voltage into the second voltage or to convert the second voltage into the first voltage.

In one embodiment, the zero current estimation circuit is configured to operably generate the zero current estimation signal at a time point which is earlier than the time point at which the first resonant current is zero and/or at a time point which is earlier than the time point at which the at least one second resonant current is zero, whereby the control signal is generated according to the zero current estimation signal.

In one embodiment, the zero current estimation circuit is configured to operably generate the zero current estimation signal at a time point which is exactly the time point at which the first resonant current is zero and/or at a time point which is exactly the time point at which the at least one second resonant current is zero, whereby the control signal is generated according to the zero current estimation signal.

In one embodiment, the at least one inductor includes: a first inductor and a second inductor, and/or wherein the at least one resonant capacitor includes: a first resonant capacitor and a second resonant capacitor, wherein the time point at which the first resonant current flows through the first inductor and/or the first resonant capacitor is earlier than the time point at which the second resonant current flows through the second inductor and/or the second resonant capacitor, wherein the zero current estimation circuit is configured to operably generate the zero current estimation signal at the time point at which the first resonant current flowing through the first inductor and/or the first resonant capacitor is zero, whereby the first operation signal and the at least one second operation signal are generated according to the zero current estimation signal.

In one embodiment, when the control circuit controls the plurality of switches to be non-conductive according to the first operation signal and the second operation signal at the time point at which the first resonant current flowing through the first inductor and/or the first resonant capacitor is zero, the second resonant current flowing through the second inductor and/or the second resonant capacitor keeps freewheeling along a current freewheeling path, whereby the second resonant current flowing toward the second voltage is in a state.

In one embodiment, the state is that the second resonant current stops flowing toward the second voltage, or the second resonant current flowing toward the second voltage is a linear ramp current.

In one embodiment, the at least one inductor includes: a first inductor and a second inductor, and/or wherein the at least one resonant capacitor includes: a first resonant capacitor and a second resonant capacitor, wherein the time point at which the first resonant current flows through the first inductor and/or the first resonant capacitor is earlier than the time point at which the second resonant current flows through the second inductor and/or the second resonant capacitor, wherein the zero current estimation circuit is configured to operably generate the zero current estimation signal at a time point which is earlier than the time point at which the first resonant current flowing through the first inductor and/or the first resonant capacitor is zero, whereby the first operation signal and the at least one second operation signal are generated according to the zero current estimation signal.

In one embodiment, when the control circuit controls the plurality of switches to be non-conductive according to the first operation signal and the second operation signal at a time point which is earlier than the time point at which the first resonant current flowing through the first inductor and/or the first resonant capacitor is zero, the first resonant current flowing through the first inductor keeps freewheeling along a corresponding current freewheeling path and/or the first resonant capacitor and the second resonant current flowing through the second inductor and/or the second resonant capacitor keeps freewheeling along a corresponding current freewheeling path, whereby the first resonant capacitor flowing toward the second voltage and the second resonant current flowing toward the second voltage are in respective corresponding states.

In one embodiment, the states are that the first resonant current and the second resonant current both stop flowing toward the second voltage, or each of the first resonant current flowing toward the second voltage and the second resonant current flowing toward the second voltage is a linear ramp current.

In one embodiment, a current variation speed of the linear ramp current is greater than a current variation speed of the first resonant current in a resonant mode and a current variation speed of the second resonant current in the resonant mode.

In one embodiment, after the linear ramp current decreases to zero or near zero, a part of the pluralities of the switches are conductive, so as to execute the first process and/or the at least one second process.

In one embodiment, after a time point when the linear ramp current has decreased for a delay period and earlier than a time point when the linear ramp current reaches zero, a part of the pluralities of the switches are conductive, so as to execute the first process and/or the at least one second process.

In one embodiment, the switched capacitor voltage converter circuit further comprises: a non-resonant capacitor coupled to a resonant capacitor, wherein a voltage across the non-resonant capacitor is kept as a constant DC voltage in the first process and the at least one second process.

In one embodiment, the zero current estimation circuit includes: a voltage detection circuit, which is configured to operably generate a voltage detection signal according to the voltage difference across the two ends of the at least one inductor, wherein the voltage detection signal is indicative of a positive voltage period wherein the voltage difference across the two ends of the at least one inductor is above zero voltage; and a timer, which is coupled to an output end of the voltage detection circuit and which is configured to operably generate the zero current estimation signal according to the voltage detection signal.

In one embodiment, the zero current estimation circuit includes: a voltage detection circuit, which is configured to operably generate a voltage detection signal according to the voltage difference across two ends of the at least one resonant capacitor, wherein the voltage detection signal is indicative of an occurrence time point of a peak of the voltage difference across the two ends of the at least one resonant capacitor and an occurrence time point of a valley of the voltage difference across the two ends of the at least one resonant capacitor, and wherein the zero current estimation signal is generated according to the voltage detection signal.

In one embodiment, the timer includes: a ramp circuit, which is configured to operably generate a rising ramp of a ramp signal according to the voltage detection signal during the positive voltage period, and to operably generate a falling ramp of the ramp signal according to the rising ramp after the positive voltage period ends; and a comparison circuit, which is configured to operably compare the ramp signal with a zero current threshold, so as to generate the zero current estimation signal for determining a starting time point and an ending time point of the first process and a starting time point and an ending time point of the at least one second process.

In one embodiment, the ramp circuit includes: a boost circuit, which is configured to operably increase a voltage across a ramp capacitor from zero during the positive voltage period, so as to generate the rising ramp; and a buck circuit, which is configured to operably decrease the voltage across the ramp capacitor after the positive voltage period ends, so as to generate the falling ramp; wherein an absolute value of the slope of the rising ramp is the same as an absolute value of the slope of the falling ramp.

In one embodiment, the boost circuit includes: a first switch; and a first current source; wherein the first switch is configured to operably conduct the first current source to charge the ramp capacitor according to the voltage detection signal during the positive voltage period.

In one embodiment, the buck circuit includes: a second switch; and a second current source; wherein the second switch is configured to operably conduct the second current source to discharge the ramp capacitor after the positive voltage period ends.

In one embodiment, the control circuit includes: a switch control circuit, which is configured to operably generate the first operation signal and the at least one second operation signal according to the zero current estimation signal; and a delay circuit, which is configured to operably maintain the zero current estimation signal for a delay period, so that the first process and the at least one second process are separated from each other by the delay period.

In one embodiment, the voltage detection circuit includes: at least one comparator, which is configured to operably compare voltages at two ends of the at least one inductor.

In one embodiment, the at least one comparator includes two comparators, and the at least one inductor includes a first inductor and a second inductor, wherein one of the two comparators is coupled to the two ends of the first inductor, whereas, the other of the two comparators is coupled to the two ends of the second inductor.

In one embodiment, during the delay period, the plurality of switches are kept OFF.

In one embodiment, the timer adjusts a level to the zero current threshold to shorten or prolong a period of the zero current estimation signal.

In one embodiment, the timer includes: a counter circuit; and a determination circuit; wherein when the voltage detection signal is switched from low level to high level, the counter circuit starts counting according to a clock signal and outputs a counting result to the determination circuit, and wherein when the voltage detection signal is switched from high level to low level, the counter circuit counts down from a last counting result according to the clock signal; wherein when the counter circuit counts down to zero or a counting threshold, the determination circuit generates the zero current estimation signal.

In one embodiment, after the determination circuit generates the zero current estimation signal, the determination circuit outputs a reset signal to the counter circuit, so as to reset the counter circuit.

In one embodiment, the switched capacitor converter comprises a distributed switched capacitor converter, a series-parallel switched capacitor converter, a Dickson switched capacitor converter, a ladder switched capacitor converter, a pipelined switched capacitor converter, or a switched tank converter.

In one embodiment, the series-parallel switched capacitor converter includes: a 2-to-1 series-parallel switched capacitor converter, a 3-to-1 series-parallel switched capacitor converter, or a 4-to-1 series-parallel switched capacitor converter.

In one embodiment, the DC potential is ground potential.

Advantages of the present invention include: that, because the present invention can provide adaptive ON periods and adaptive delay periods, to cover size tolerance of the devices; and that, the present invention can minimize the delay period, to effectively reduce the consumed current and the conduction power loss; and that, because it is not required for the present invention to employ a current sensing resistor or a current sensing transformer, the present invention can reduce the power loss caused by a high current passing through the current sensing resistor and the present invention can solve the precision issue of using a current sensing resistor in a case where the current is a low current.

The objectives, technical details, features, and effects of the present invention will be better understood with regard to the detailed description of the embodiments below, with reference to the attached drawings.

BRIEF DESCRIPTION OF THE DRAWINGS

FIG. 13 illustrates waveform diagrams of relevant signals related to a situation where the switched capacitor voltage converter circuit operates in a situation that the switches are both turned OFF at a time point when an earlier one of the resonant currents is zero according to still another embodiment of the present invention, in comparison with the case of FIG. 11.

FIG. 14 illustrates waveform diagrams of relevant signals related to a situation where the switched capacitor voltage converter circuit operates in a situation that the switches are turned OFF before a time point at which one of the resonant currents is zero according to still another embodiment of the present invention.

FIG. 15 shows a comparison table among the embodiments shown in FIG. 10 to FIG. 14.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
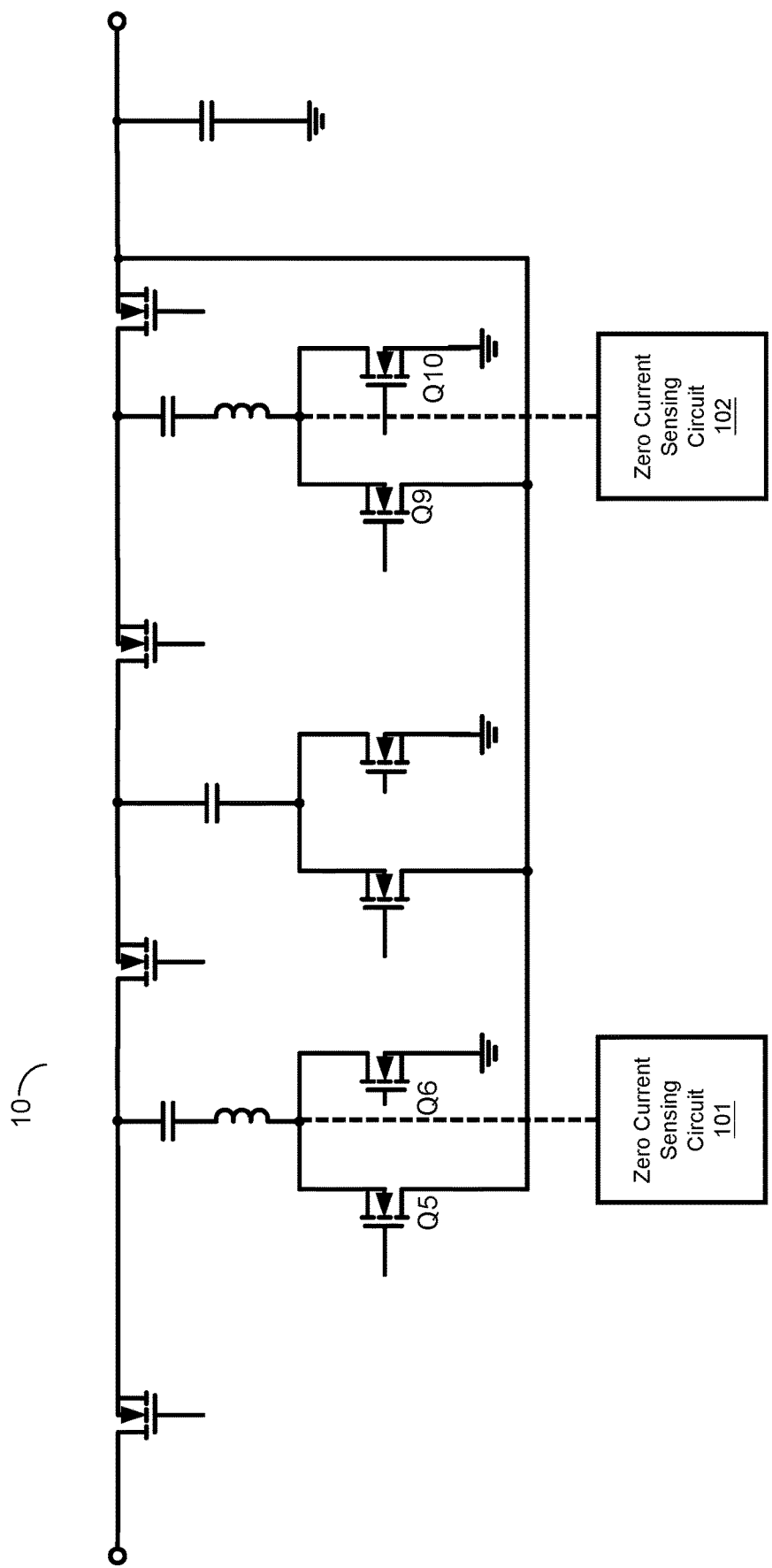
FIG. 1 shows a schematic diagram of a conventional power converter.
Figure 2:
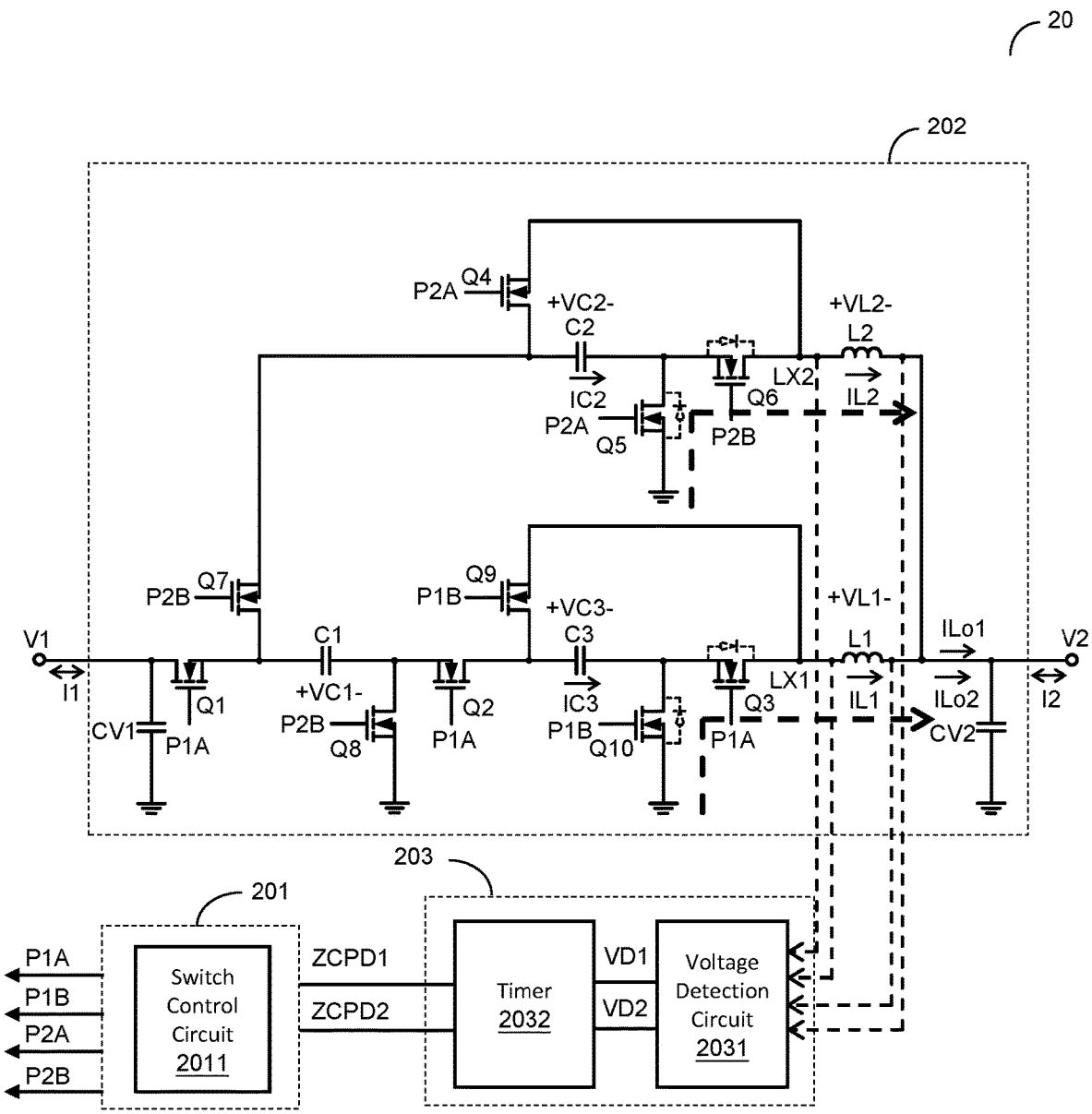
FIG. 2 shows a schematic circuit diagram of a switched capacitor voltage converter circuit according to an embodiment of the present invention.

FIG. 2 illustrates a schematic diagram of a switched capacitor voltage converter circuit (i.e., switched capacitor voltage converter circuit 20) in accordance with one embodiment of the present invention. The switched capacitor voltage converter circuit 20 is configured to operably convert a first voltage V1 to a second voltage V2 or is configured to operably convert the second voltage V2 to the first voltage V1. In this embodiment, the switched capacitor voltage converter circuit 20 includes: a control circuit 201, a switched capacitor circuit 202 and a zero current estimation circuit 203. The switched capacitor converter 202 includes: a non-resonant capacitor C1, a resonant capacitor C2, and a resonant capacitor C3, and plural switches (e.g., switches Q1~Q10) which are coupled with one another. It should be explained that, when the capacitance of the capacitor C1 is much larger than the capacitances of the capacitors C2 and C3, the capacitor C1 is regarded as a non-resonant capacitor.

In one embodiment, during a first process, the switches (e.g., switches Q1~Q10) are configured to operably control the non-resonant capacitor C1 and the resonant capacitor C3 to be electrically connected in series between the first voltage V1 and the second voltage V2, and to operably control the resonant capacitor C2 to be electrically connected in parallel to the second voltage V2, wherein the other end of the resonant capacitor C2 is controlled to be coupled to a ground voltage level. Specifically, the switches Q1~Q3 are ON, so as to control the non-resonant capacitor C1 and the resonant capacitor C3 to be electrically connected in series between the first voltage V1 and the second voltage V2, whereas, the switches Q4~Q5 are ON, so as to control the resonant capacitor C2 to be electrically connected in parallel to the second voltage V2; in the meantime, the switches Q6~Q10 are OFF. In this embodiment, during the first process, the operation signal P1A and the operation signal P2A are in enable state, so that the switches controlled by the these signals are ON. On the other hand, during the first process, the operation signal P1B and the operation signal P2B are in disable state, so that the switches controlled by these signals are OFF.

During a second process, the switches (e.g., switches Q1~Q10) are configured to operably control the resonant capacitor C2 and the non-resonant capacitor C1 to be electrically connected in series between the second voltage V2 and a ground voltage level, and to operably control the resonant capacitor C3 to be electrically connected in parallel to the second voltage V2. In one embodiment, during the second process, the resonant capacitor C2 and the non-resonant capacitor C1 are electrically connected in series in a reversed direction between the second voltage V2 and the ground voltage level. Specifically, the switches Q6~Q8 are ON, so as to control the resonant capacitor C2 and the non-resonant capacitor C1 to be electrically connected in series between the second voltage V2 and the ground voltage level, and the switches Q9~Q10 are ON, so as to control the resonant capacitor C3 to be electrically connected in parallel to the second voltage V2; in the meantime, the switches Q1~Q5 are OFF. In this embodiment, during the second process, the operation signal P1A and the operation signal P2A are in disable state, so that the switches controlled by the operation signal P1A and the operation signal P2A are OFF. On the other hand, during the second process, the operation signal P1B and the operation signal P2B are in enable state, so that the switches controlled by the operation signal P1B and the operation signal P2B are ON.

The switched capacitor voltage converter circuit 20 executes power conversion between the first voltage V1 and the second voltage V2 through periodically conducting the above-mentioned operations. In this embodiment, a ratio of the first voltage V1 of the first voltage V1 to the second voltage V2 of the second voltage V2 is equal to 4.

It is worthwhile noting that, as one having ordinary skill in the art readily understands, the term "electrically connected in series 'in a reversed direction'", refers to that the voltage across the resonant capacitor C2 and the voltage across the non-resonant capacitor C1 are in opposite direction to each other (i.e., the direction from the positive end to the negative end of the capacitor C2 is opposite to the direction from the positive end to the negative end of the capacitor C1).

In the embodiment wherein the first voltage V1 is converted to the second voltage V2, during the first process, the first voltage V1 charges the non-resonant capacitor C1 and the resonant capacitor C3 which are electrically connected in series, whereas, the resonant capacitor C2 is discharged, to thereby supply power to the second voltage V2; that is, the resonant capacitor C2 charges a capacitor CV2 coupled to the second voltage V2. On the other hand, during the second process, the non-resonant capacitor C1 charges the resonant capacitor C2 and the second voltage V2.

In addition, in the embodiment wherein the second voltage V2 is converted to the first voltage V1, during the first process, the second voltage V2 charges the non-resonant capacitor C1 and the resonant capacitor C3 which are electrically connected in series, and the second voltage V2 charges the resonant capacitor C2. On the other hand, during the second process, the second voltage V2 charges the resonant capacitor C3, and the second voltage V2 charges the non-resonant capacitor C1 via the resonant capacitor C2.

Through periodically conducting the above-mentioned operations, in this embodiment, in a steady state, a ratio of the voltage VC1 across the non-resonant capacitor C1 to the second voltage V2 is equal to 2. A ratio of a voltage VC3 across the resonant capacitor C3 to the second voltage V2 is equal to 1. And, a ratio of a voltage VC2 across the resonant capacitor C2 to the second voltage V2 is equal to 1. In an implementation wherein the second voltage V2 is equal to 12V, in a steady state, the voltage VC3 across the resonant capacitor C3 and the voltage VC2 across the resonant capacitor C2 are both equal to 12V. It is worthwhile noting that, because the present invention can ensure the voltage across a capacitor to be kept at a relatively lower voltage level in a steady state, the effective capacitance of such capacitor is in fact higher. As a result, both the required voltage withstanding capability and the required size for such capacitor can be effectively reduced. Besides, under such situation, the resonant frequency of the present invention is relatively stabler and the transient response is better. Moreover, it is worthwhile noting that, because the output current (e.g., corresponding to the second current I2) of the present invention is provided through two channels, ripple can be reduced.

In the embodiment wherein the first voltage V1 is converted to the second voltage V2, the non-resonant capacitor CV1 coupled to the first voltage V1 and the non-resonant capacitor CV2 coupled to the second voltage V2 correspond to an input capacitor and an output capacitor, respectively. Or, in the embodiment wherein the second voltage V2 is converted to the first voltage V1, the non-resonant capacitor CV1 coupled to the first voltage V1 and the non-resonant capacitor CV2 coupled to the second voltage V2 correspond to an output capacitor and an input capacitor, respectively.

The switched capacitor converter 202 of this embodiment further includes an inductor L1 and an inductor L2. The inductor L1 is coupled between the second voltage V2 and a first switching node LX1, whereas, the inductor L2 is coupled between the second voltage V2 and a second switching node LX2. During the first process, the switches (e.g., switches Q1~Q10) control the non-resonant capacitor C1 and the resonant capacitor C3 to be electrically connected in series to the inductor L1 via the first switching node LX1, and the series circuit formed by the non-resonant capacitor C1, the resonant capacitor C3 and the inductor L1 is electrically connected in series between the first voltage V1 and the second voltage V2, and, the switches Q1~Q10 control the resonant capacitor C2 to be electrically connected in series to the inductor L2 via the second switching node LX2, and the series circuit formed by the resonant capacitor C2 and the inductor L2 is electrically connected in parallel to the second voltage V2. On the other hand, during the second process, the switches Q1~Q10 control the resonant capacitor C2 and the non-resonant capacitor C1 to be electrically connected in series to the inductor L2 via the second switching node LX2, and the series circuit formed by the resonant capacitor C2, the non-resonant capacitor C1 and the inductor L2 is electrically connected in series between the second voltage V2 and the ground voltage level, and, the switches Q1~Q10 control the resonant capacitor C3 to be electrically connected in series to the inductor L1 via the first switching node LX1, and the series circuit formed by the resonant capacitor C3 and the inductor L1 is electrically connected in parallel to the second voltage V2. In one embodiment, both the inductor L1 and the inductor L2 operate in a continuous conduction mode, thereby further reducing inrush current and ripple current.

In one embodiment, the capacitance of the non-resonant capacitor C1 is far larger than the capacitance of the resonant capacitor C3 and the capacitance of the resonant capacitor C2, so that a first resonant frequency of the resonant capacitor C3 and the inductor, and a second resonant frequency of the resonant capacitor C2 and the inductor, are both far larger than a third resonant frequency of the non-resonant capacitor C1 and the inductor. In one embodiment, the first resonant frequency and the second resonant frequency are both greater than or equal to ten times of the third resonant frequency.

The zero current estimation circuit 203 is coupled to the inductor L1 and the inductor L2. The zero current estimation circuit 203 is configured to operably estimate a time point at which a first resonant current is zero during the first process and/or estimate a time point at which a second resonant current is zero during the second process according to a voltage difference across two ends of the inductor L1 and a voltage difference across two ends of the inductor L2, respectively, so as to correspondingly generate a zero current estimation signal ZCPD 1 and a zero current estimation signal ZCPD 2, respectively, at a time point which is not later than the time point at which the first resonant current is zero and/or the time point at which at least one second resonant current is zero, whereby the zero current estimation signal ZCPD 1 generates the first operation signal P1A and the first operation signal P2A, whereas, the zero current estimation signal ZCPD 2 generates the second operation signal P1B and the second operation signal P2B. In one embodiment, the zero current estimation circuit 203 is configured to operably generate a zero current estimation signal ZCPD 1 and a zero current estimation signal ZCPD 2, respectively, at a time point which is earlier than the time point at which the first resonant current is zero and/or the time point at which at least one second resonant current is zero, whereby the zero current estimation signal ZCPD 1 generates the first operation signal P1A and the first operation signal P2A, whereas, the zero current estimation signal ZCPD 2 generates the second operation signal P1B and the second operation signal P2B. In another embodiment, the zero current estimation circuit 203 is configured to operably generate a zero current estimation signal ZCPD 1 and a zero current estimation signal ZCPD 2, respectively, at a time point which is exactly the time point at which the first resonant current is zero and/or the time point at which at least one second resonant current is zero, whereby the first operation signal P1A and the first operation signal P2A, and the second operation signal P1B and the second operation signal P2B, are generated according to the zero current estimation signal ZCPD 1 and the zero current estimation signal ZCPD 2.

In one embodiment, the zero current estimation circuit 203 includes: a voltage detection circuit 2031 and a timer 2032. Please refer to FIG. 2 together with FIG. 4. FIG. 4 illustrates waveform diagrams of relevant signals related to the operation of the embodiment shown in FIG. 2 and the operation of the embodiment shown in FIG. 3. The embodiment shown in FIG. 4 illustrates a situation where: a zero current estimation signal ZCPD 1 and a zero current estimation signal ZCPD 2 are generated, respectively, at a time point which is exactly the time point at which the first resonant current is zero and/or the time point at which at least one second resonant current is zero. The voltage detection circuit 2031 is configured to operably generate a voltage detection signal VD1 according to the voltage difference VL1 across the two ends of the inductor L1, wherein the voltage detection signal VD is indicative of a positive voltage period T1 wherein the voltage difference VL1 across two ends of the inductor L1 is positive, and/or, the voltage detection circuit 2031 is configured to operably generate a voltage detection signal VD2 according to the voltage difference VL2 across the two ends of the inductor L2, wherein the voltage detection signal VD2 is indicative of a positive voltage period T1 wherein the voltage difference VL2 across two ends of the inductor L2 is positive. The timer 2032 is coupled to an output end of the voltage detection circuit 2031 and is configured to operably generate the zero current estimation signal ZCPD 1 and the zero current estimation signal ZCPD 2 according to the voltage detection signal VD1 and the voltage detection signal VD1, respectively. The zero current estimation signal ZCPD 1 is indicative of a time point at which the inductor current IL1 is zero, whereas, the zero current estimation signal ZCPD 2 is indicative of a time point at which the inductor current IL2 is zero. The control circuit 201 is coupled to the zero current estimation circuit 203. The control circuit 201 is configured to operably determine the first operation signals P1A and P2A and the second operation signals P1B and P2B according to the zero current estimation signal ZCPD 1 and the zero current estimation signal ZCPD 2, respectively. The first operation signals P1A and P2A and the second operation signals P1B and P2B are configured to operably control the switches Q1~Q10. In one embodiment, the control circuit 201 is configured to operably determine a starting time point and an ending time point of the first process and a starting time point and an ending time point of the second process according to the zero current estimation signal ZCPD 1 and the zero current estimation signal ZCPD 2, the first operation signals P1A and P2A, and/or the second operation signals P1B and P2B.

Figure 3:
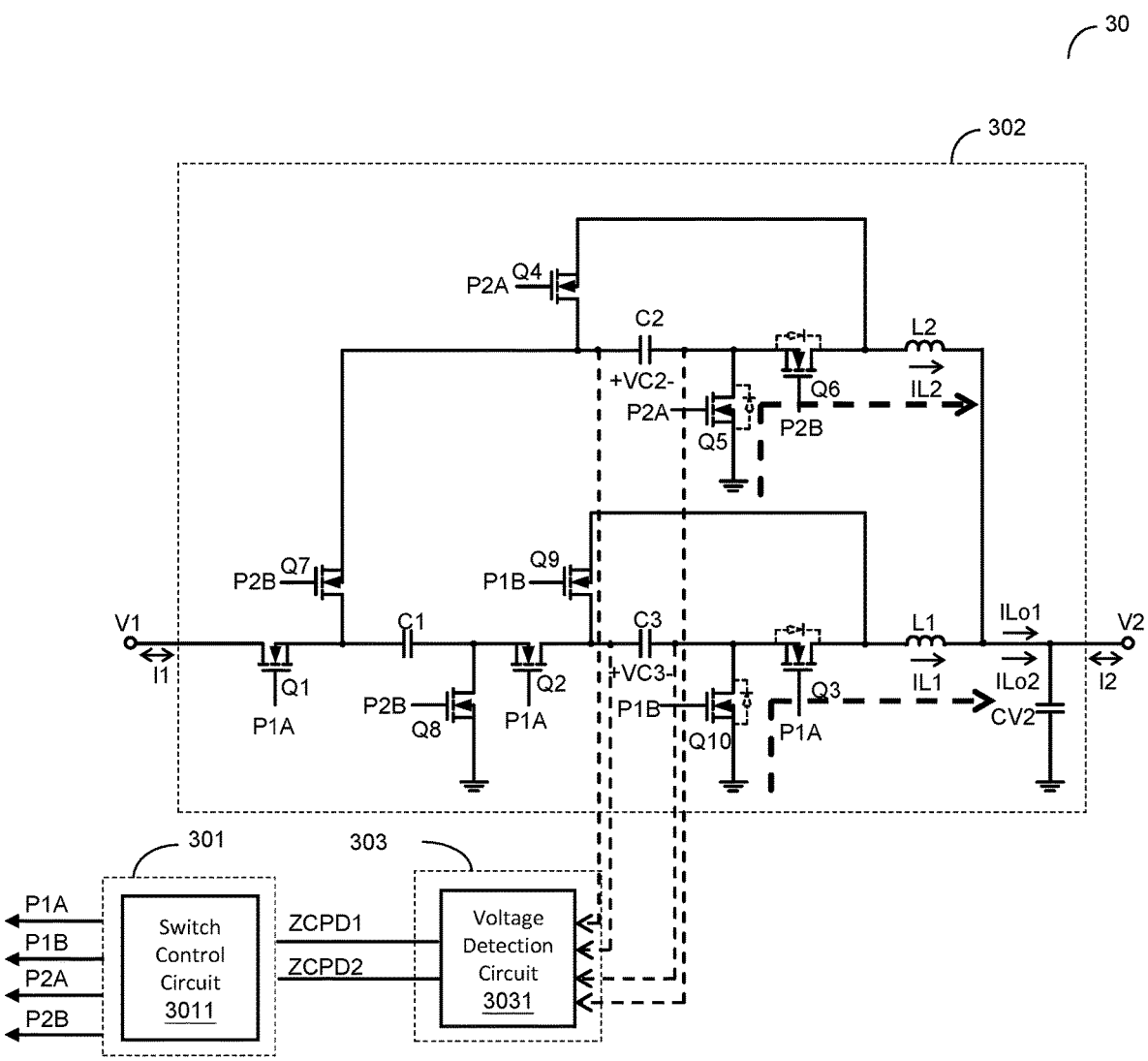
FIG. 3 shows a schematic circuit diagram of a switched capacitor voltage converter circuit according to another embodiment of the present invention.
Figure 4:
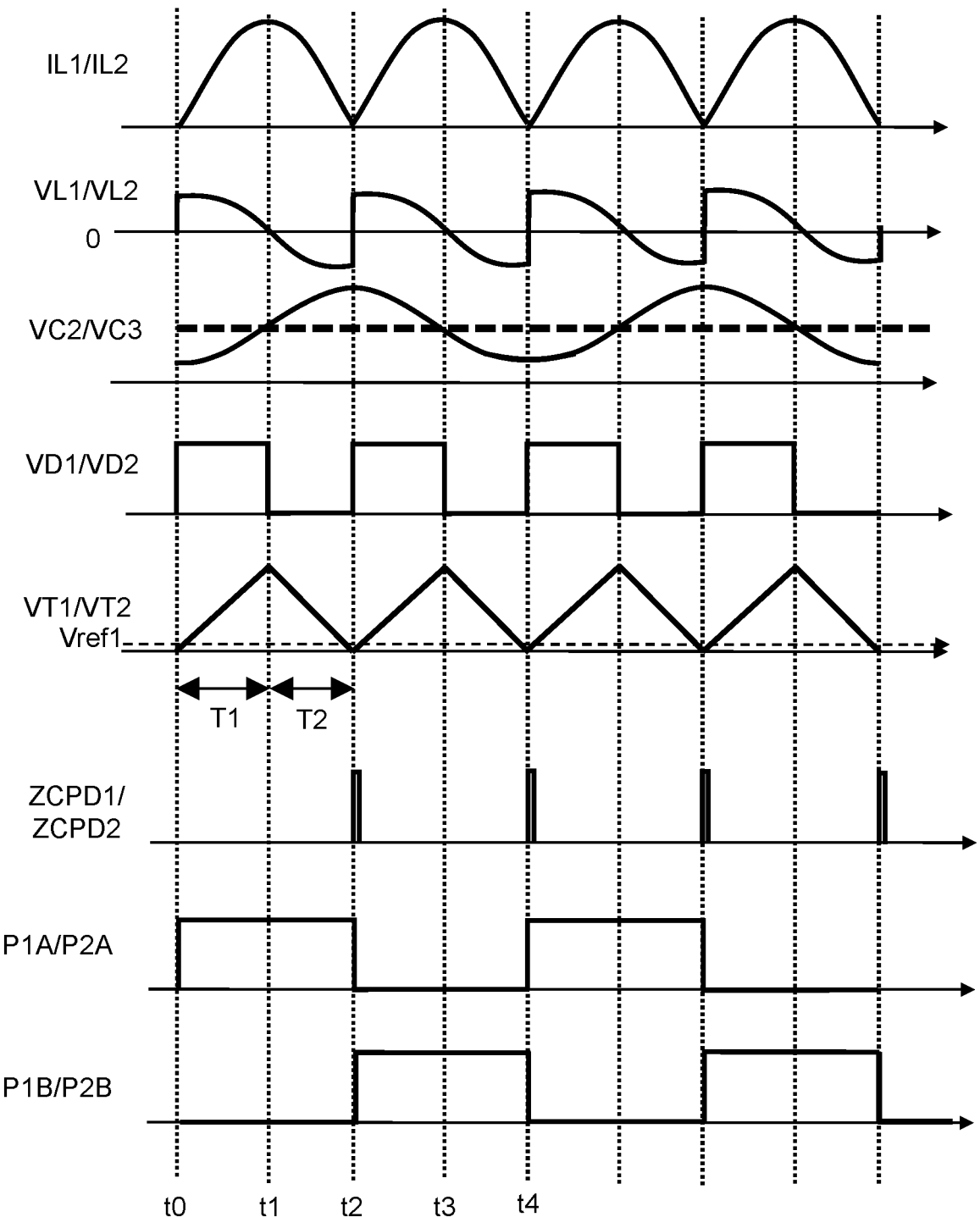
FIG. 4 illustrates waveform diagrams of relevant signals related to the operation of the embodiment shown in FIG. 2 and the operation of the embodiment shown in FIG. 3.

Please refer to FIG. 3, which shows a schematic circuit diagram of a switched capacitor voltage converter circuit (i.e., switched capacitor voltage converter circuit 30) according to another embodiment of the present invention. This embodiment shown in FIG. 3 is similar to the embodiment shown in FIG. 2, but is different in that: the zero current estimation circuit 303 in this embodiment is coupled to the resonant capacitor C2 and the resonant capacitor C3. The zero current estimation circuit 303 is configured to operably estimate a time point at which a first resonant current is zero during the first process and/or estimate a time point at which a second resonant current is zero during the second process according to a voltage difference VC2 across two ends of the resonant capacitor C2 and a voltage difference VC3 across two ends of the resonant capacitor C3, so as to correspondingly generate a zero current estimation signal ZCPD 1 and a zero current estimation signal ZCPD 2, respectively, at a time point which is not later than the time point at which the first resonant current is zero and/or not later than the time point at which the second resonant current is zero, whereby the first operation signal P1A and the first operation signal P2A are generated according to the zero current estimation signal ZCPD 1, whereas, the second operation signal P1B and the second operation signal P2B are generated according to the zero current estimation signal ZCPD 2. In this embodiment, the zero current estimation circuit 303 includes a voltage detection circuit 3031, which is configured to operably generate a voltage detection signal VD1 and a voltage detection signal VD2 according to the voltage difference VC2 across two ends of the resonant capacitor C2 and the voltage difference VC3 across two ends of the resonant capacitor C3, respectively, wherein the voltage detection signal VD1 and the voltage detection signal VD2 are indicative of an occurrence time point of a peak of the voltage difference VC2 across two ends of the resonant capacitor C2 and an occurrence time point of a peak of the voltage difference VC3 across two ends of the resonant capacitor C3, respectively (e.g., as shown by the timing point t2 in FIG. 4) and are also indicative of an occurrence time point of a valley of the voltage difference VC2 across two ends of the resonant capacitor C2 and an occurrence time point of a valley of the voltage difference VC3 across two ends of the resonant capacitor C3, respectively (e.g., as shown by the timing point t4 in FIG. 4). The zero current estimation signal ZCPD 1 is generated according to the voltage detection signal VD1, whereas, the zero current estimation signal ZCPD 2 is generated according to the voltage detection signal VD2. Peak and valley detections can be achieved by various ways, which are well known to those skilled in the art, so the details thereof are not redundantly explained here.

Figure 5:
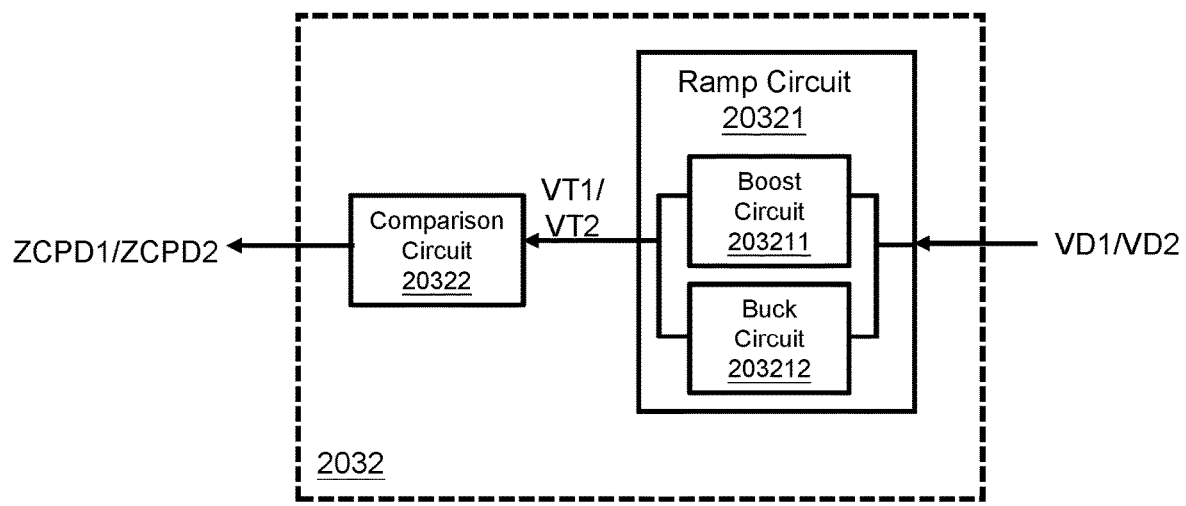
FIG. 5 shows a schematic circuit diagram of a timer of a switched capacitor voltage converter circuit according to an embodiment of the present invention.

Please refer to FIG. 5, which shows an embodiment of a timer in a switched capacitor voltage converter circuit according to an embodiment of the present invention. The timer 2032 of this embodiment is one specific embodiment of the timer 2032 shown in FIG. 2. The timer 2032 shown in FIG. 2 can be embodied as an analog-type timer or a digital-type timer. The timer 2032 shown in FIG. 5 is an example of an analog-type timer. In this embodiment, the timer 2032 shown in FIG. 5 includes a ramp circuit 20321 and a comparison circuit 20322. Please refer to FIG. 2 together with FIG. 4. The ramp circuit 20321 is coupled to a voltage detection circuit 2031. The ramp circuit 20321 is configured to operably generate a rising ramp of a ramp signal VT1 or a ramp signal VT2 according to the voltage detection signal VD1 or the voltage detection signal VD2 during the positive voltage period T1, and to operably generate a falling ramp of the ramp signal VT1 or the ramp signal VT2 during a negative voltage period T2 according to the rising ramp after the positive voltage period T1 ends. As one having ordinary skill in the art readily understands, "positive voltage period T1" refers to a period wherein the voltage difference VL1 across two ends of the inductor L1 or the voltage difference VL2 across two ends of the inductor L2 is above zero voltage, and "negative voltage period T2" refers to a period wherein the voltage difference VL1 across two ends of the inductor L1 or the voltage difference VL2 across two ends of the inductor L2 is below zero voltage. The comparison circuit 20322 is coupled to the ramp circuit 20321. The comparison circuit 20322 is configured to operably compare the ramp signal VT1 or VT2 with a zero current threshold Vref1, so as to generate the zero current estimation signal ZCPD 1 or the zero current estimation signal ZCPD 2 for determining a starting time point and an ending time point of the first process and a starting time point and an ending time point of the second process.

In one embodiment, the ramp circuit 20321 includes: a boost circuit 203211 and a buck circuit 203212. The boost circuit 203211 is configured to operably increase a voltage across a ramp capacitor from zero during the positive voltage period T1, so as to generate the rising ramp. The buck circuit 203212 is configured to operably decrease the voltage across the ramp capacitor after the positive voltage period T1 ends, so as to generate the falling ramp. During the voltage increasing operation by the boost circuit 203211 and the voltage decreasing operation by the buck circuit 203212, the boost circuit 203211 and the buck circuit 203212 will output the voltage VT1 or the voltage VT2 across the ramp capacitor to the comparison circuit 20322, so that the comparison circuit 20322 can compare the voltage VT1 or the voltage VT2 with the zero current threshold Vref1. In one embodiment, an absolute value of a slope of the rising ramp is the same as an absolute value of a slope of the falling ramp. Thus, as the positive voltage period T1 is obtained, an ending time point of 2-fold of the positive voltage period T1 (i.e., 2*T1) is the occurrence time point of zero current. In one embodiment, the zero current threshold Vref1 is approximately zero. In one embodiment, the level of the zero current threshold Vref1 is adjustable. For example, the level of the zero current threshold Vref1 can be adjusted up or down, so as to adjust the time point of earlier turning OFF the switches.

Figure 6:
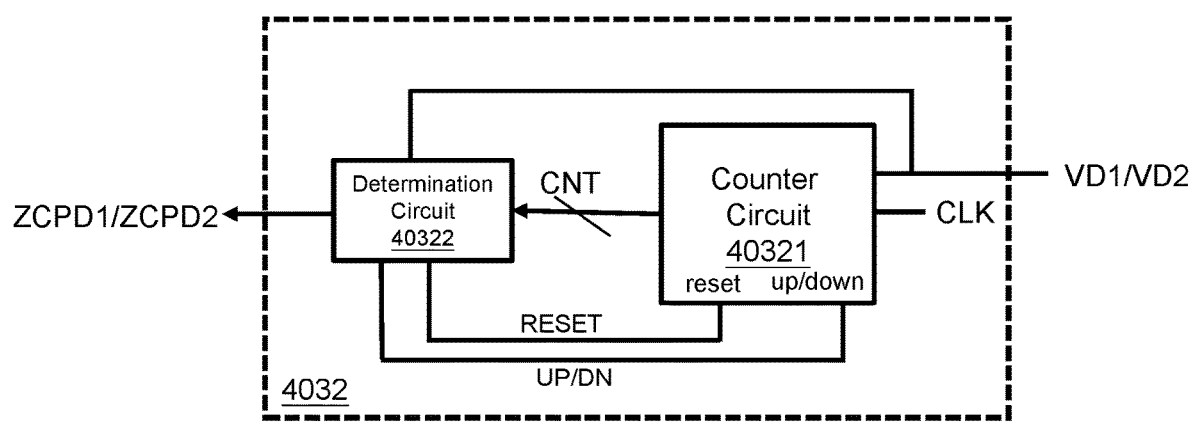
FIG. 6 shows a schematic circuit diagram of a timer of a switched capacitor voltage converter circuit according to another embodiment of the present invention.

Please refer to FIG. 6, which shows an embodiment of a timer in a switched capacitor voltage converter circuit according to another embodiment of the present invention. The timer 4032 of this embodiment is one specific embodiment of the timer 2032 shown in FIG. 2. The timer 4032 shown in FIG. 6 is an example of a digital-type timer. In one embodiment, the timer 4032 includes: a counter circuit 40321 and a determination circuit 40322. The counter circuit 40321 is coupled to the voltage detection circuit 2031. The counter circuit 40321 is configured to operably generate a counting signal CNT according to the voltage detection signal VD1 or the voltage detection signal VD2 and a clock signal CLK. The counting signal CNT is indicative of a current count. The determination circuit 40322 is coupled to the counter circuit 40321. The determination circuit 40322 is configured to operably generate the zero current estimation signal ZCPD 1 or the zero current estimation signal ZCPD 2 and a reset signal RESET according to the counting signal CNT. The determination circuit 40322 is also configured to operably generate a counting-up signal UP and a counting-down signal DN according to the voltage detection signal VD1 or the voltage detection signal VD2. On one hand, when the determination circuit 40322 detects that the voltage detection signal VD1 or the voltage detection signal VD2 is at high level, the determination circuit 40322 generates the counting-up signal UP, which is fed back to the counter circuit 40321, so that the counter circuit 40321 starts counting-up from zero according to a speed (frequency) of the clock signal CLK to generate a count which is the counting signal CNT, and the counting signal CNT is outputted to the determination circuit 40322. On the other hand, when the determination circuit 40322 detects that the voltage detection signal VD1 or the voltage detection signal VD2 is at low level, the determination circuit 40322 generates the counting-down signal DN, which is fed back to the counter circuit 40321, so that the counter circuit 40321 starts counting-down from a last counting result according to the speed (frequency) of the clock signal CLK. When the determination circuit 40322 detects that that the counting signal CNT is zero, the determination circuit 40322 determines that the counter circuit 40321 has counted down to zero and the determination circuit 40322 generates the zero current estimation signal ZCPD 1 or the zero current estimation signal ZCPD 2 accordingly, and the determination circuit 40322 also generates the reset signal RESET, which is fed back to the counter circuit 40121, to reset the counter circuit 40321.

Figure 7:
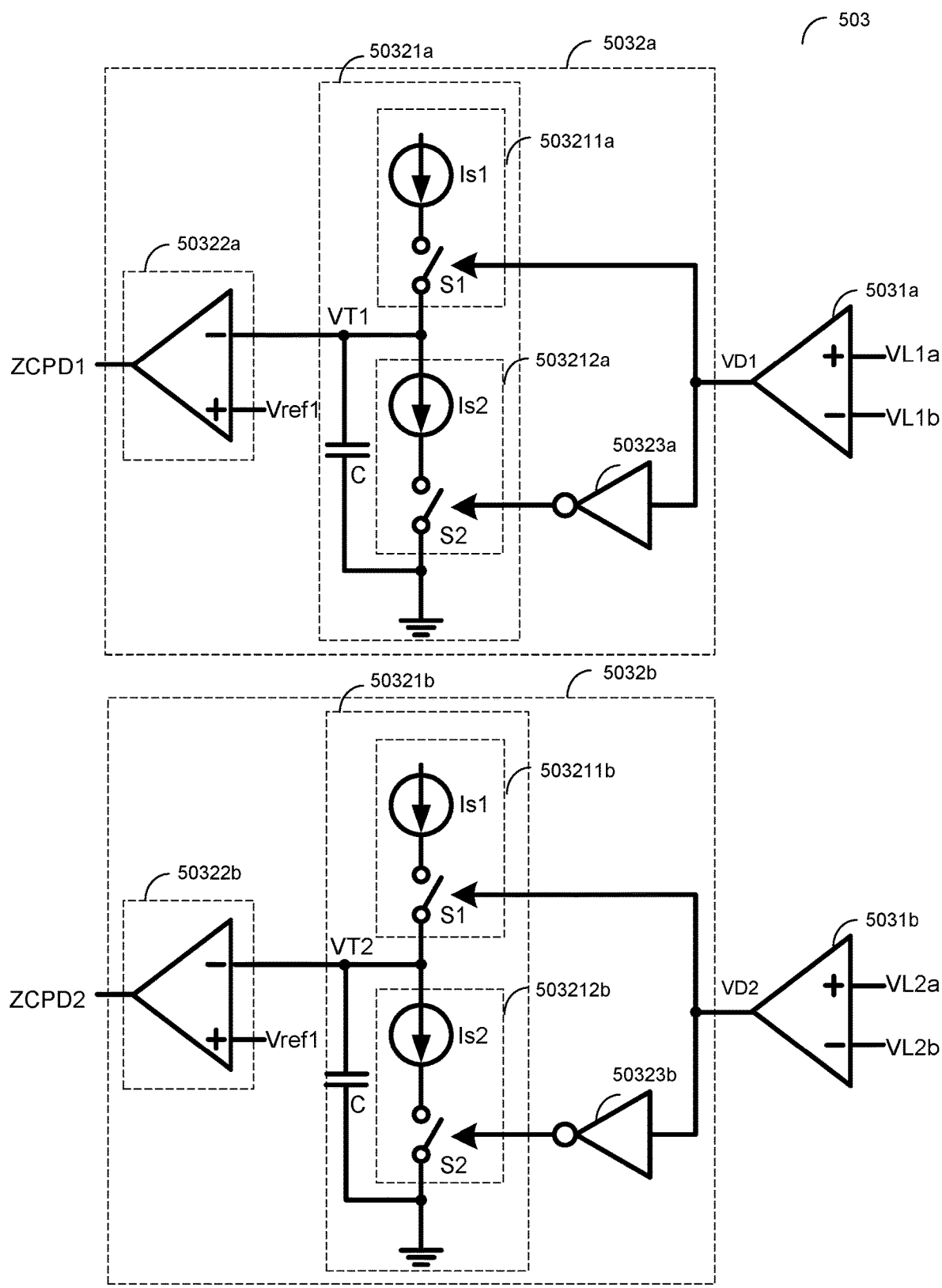
FIG. 7 shows a schematic circuit diagram of a zero current estimation circuit of a switched capacitor voltage converter circuit according to an embodiment of the present invention.

Please refer to FIG. 7, which shows a schematic circuit diagram of an embodiment of a zero current estimation circuit in a switched capacitor voltage converter circuit according to yet another embodiment of the present invention. The zero current estimation circuit 503 of this embodiment is one specific embodiment of the zero current estimation circuit 203 shown in FIG. 2. The timer 5032a or the timer 5032b shown in FIG. 7 is another example of a digital-type timer. As shown in FIG. 7, in one embodiment, the zero current estimation circuit 503 includes: a voltage detection circuit 5031a or a voltage detection circuit 5031b and the timer 5032a or the timer 5032b. The voltage detection circuit 5031a or the voltage detection circuit 5031b can be for example a comparator, which is configured to operably detect the voltage difference VL1 across the two ends of the inductor L1 or the voltage difference VL2 across the two ends of the inductor L2. In one embodiment, the timer 5032a shown in FIG. 7 includes: a ramp circuit 50321a and a comparison circuit 50322a. In one embodiment, the timer 5032b shown in FIG. 7 includes: a ramp circuit 50321b and a comparison circuit 50322b. The comparison circuit 50322a is configured to operably compare a voltage VT1 at a high side voltage node of the ramp capacitor C with a zero current threshold Vref1. The comparison circuit 50322b is configured to operably compare a voltage VT2 at a high side voltage node of the ramp capacitor C with a zero current threshold Vref2. In one embodiment, the zero current threshold Vref1 is a positive value. When the voltage VT1 is smaller than the zero current threshold Vref1, the comparison circuit 50322a is configured to operably generate the zero current estimation signal ZCPD 1. When the voltage VT2 is smaller than the zero current threshold Vref2, the comparison circuit 50322b is configured to operably generate the zero current estimation signal ZCPD 2.

In one embodiment, the ramp circuit 50321a includes: a boost circuit 503211a and a buck circuit 503212a, whereas, the ramp circuit 50321b includes: a boost circuit 503211b and a buck circuit 503212b. In one embodiment, the boost circuit 503211a or the boost circuit 503211b includes: a first switch S1 and a first current source Is1. The first switch S1 is configured to operably conduct the first current source Is1 to charge the ramp capacitor C according to the voltage detection signal VD1 or the voltage detection signal VD2 during the positive voltage period T1. The buck circuit 503212a or the buck circuit 503212b includes: a second switch S2 and a second current source Is2. The second switch S2 is configured to operably conduct the second current source Is2 to discharge the ramp capacitor C during a negative voltage period T2 after the positive voltage period T1 ends. Because the ramp capacitor C has one end coupled to a high side voltage node and has the other end coupled to a ground voltage level, the voltage VT1 or the voltage VT2 at the high side voltage node is the voltage across the ramp capacitor C. In one embodiment, each of the first current source Is1 and the second current source Is2 can be a bias current source.

When the voltage detection circuit 5031a detects that a voltage difference (i.e., VL1a-VL1b) between a voltage VL1a at a left side of the inductor L1 and a voltage VL1b at a right side of the inductor L1 is positive, the voltage detection circuit 5031a generates the voltage detection signal VD1 at high level, so that the first switch S1 is turned ON, thus conducting the first current source Is1 to charge the ramp capacitor C. Consequently, the voltage VT1 increases from zero. When the voltage detection circuit 5031b detects that a voltage difference (i.e., VL2a-VL2b) between a voltage VL2a at a left side of the inductor L2 and a voltage VL2b at a right side of the inductor L2 is positive, the voltage detection circuit 5031b generates the voltage detection signal VD2 at high level, so that the first switch S1 is turned ON, thus conducting the first current source Is1 to charge the ramp capacitor C. Consequently, the voltage VT2 increases from zero. Besides, a NOT operation by a NOT gate 50323a on the voltage detection signal VD1 at high level generates a low level signal to turned OFF the second switch S2, whereas, a NOT operation by a NOT gate 50323b on the voltage detection signal VD2 at high level generates a low level signal to turned OFF the second switch S2. On the other hand, when the voltage detection circuit 5031a detects that the voltage difference (i.e., VL1a-VL1b) between the voltage VL1a at the left side of the inductor L1 and the voltage VL1b at the right side of the inductor L1 is negative, the voltage detection circuit 5031a generates a voltage detection signal VD1 at low level, so that the first switch S1 is turned OFF. When the voltage detection circuit 5031b detects that the voltage difference (i.e., VL2a-VL2b) between the voltage VL2a at the left side of the inductor L2 and the voltage VL2b at the right side of the inductor L2 is negative, the voltage detection circuit 5031b generates a voltage detection signal VD2 at low level, so that the first switch S1 is turned OFF. Besides, a NOT operation by the NOT gate 50323a on the voltage detection signal VD1 at low level generates a high level signal to turned ON the second switch S2, thus causing the second current source Is2 to discharge the ramp capacitor C via the ground voltage level, whereas, a NOT operation by the NOT gate 50323b on the voltage detection signal VD2 at low level generates a high level signal to turned ON the second switch S2, thus causing the second current source Is2 to discharge the ramp capacitor C via the ground voltage level. As a consequence, the voltage VT1 or the voltage VT2 decreases. Please refer to FIG. 7 together with FIG. 2. When the comparison circuit 50322a finds that the voltage VT1 is smaller than the zero current threshold Vref1, the comparison circuit 50322a will generate a zero current estimation signal ZCPD 1, whereas, when the comparison circuit 50322b finds that the voltage VT2 is smaller than the zero current threshold Vref1, the comparison circuit 50322b will generate a zero current estimation signal ZCPD 2, whereby the control circuit 201 can generate the first operation signals P1A and P2A and the second operation signals P1B and P2B based upon the zero current estimation signal ZCPD 1 and the zero current estimation signal ZCPD 2. In one embodiment, the zero current threshold Vref1 is approximately zero. In one embodiment, the level of the zero current threshold Vref1 is adjustable. For example, the level of the zero current threshold Vref1 can be adjusted up or down, so as to adjust the earlier turning OFF time point of the switches. In one embodiment, the current level of the first current source Is1 is equal to the current level of the second current source Is2, so that the positive voltage period T1 is equal to the negative voltage period T2, as shown in FIG. 4.

Please still refer to FIG. 4, which illustrates waveform diagrams of relevant signals related to the operation of switched capacitor voltage converter circuit according to the present invention. The first resonant current IL1 or the second resonant current IL2, the inductor voltage VL1 or the inductor voltage VL2, the capacitor voltage VC2 or the capacitor voltage VC3, the voltage detection signal VD1 or the voltage detection signal VD2, the voltage VT1 or the voltage VT2, the zero current estimation signal ZCPD 1 or the zero current estimation signal ZCPD 2, the first operation signal P1A or the first operation signal P2A and the second operation signal P1B or the second operation signal P2B are illustrated in FIG. 4.

Figure 8A:
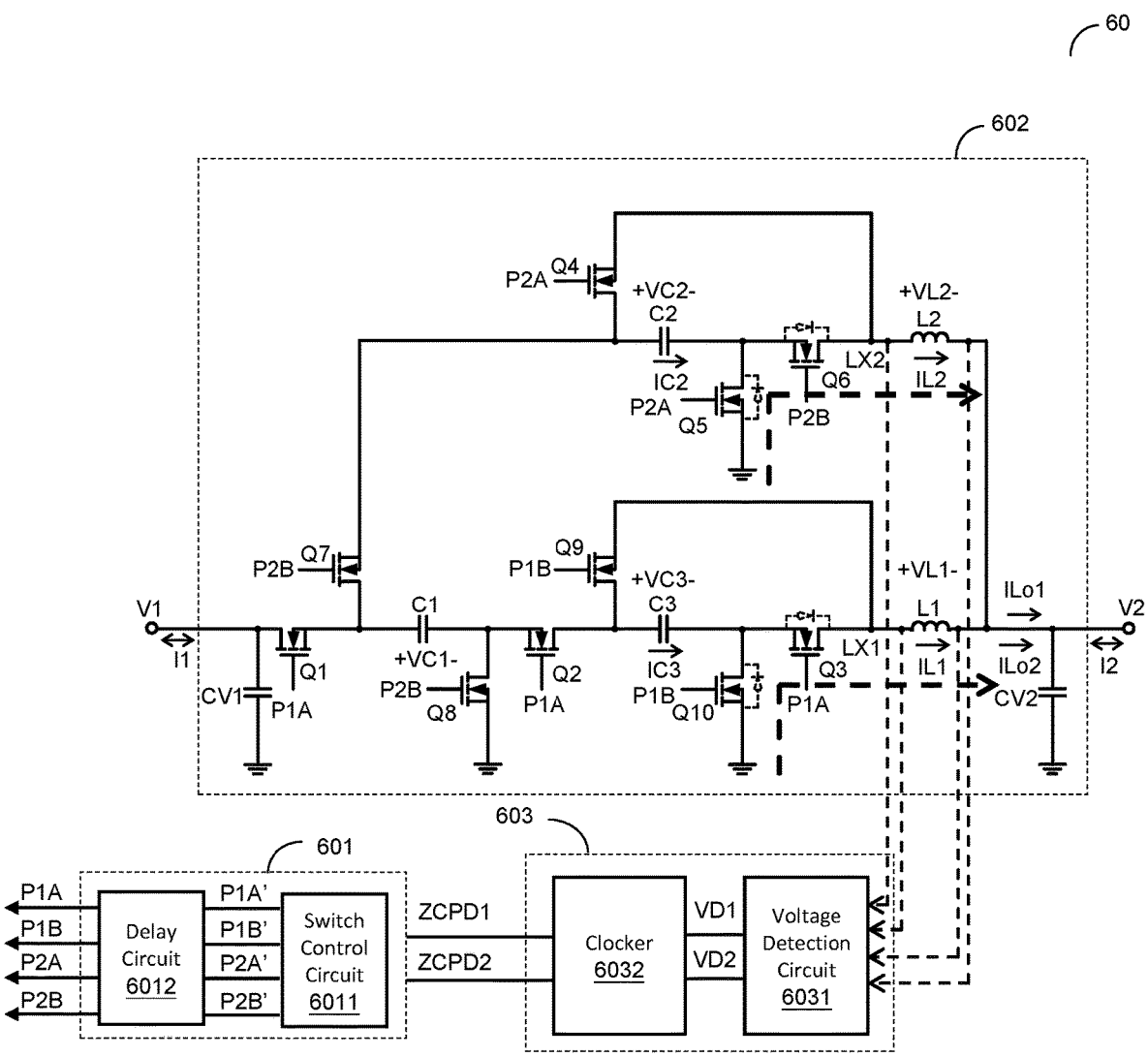
FIG. 8A shows a schematic circuit diagram of a switched capacitor voltage converter circuit according to yet another embodiment of the present invention.

Please refer to FIG. 8A, which shows a schematic circuit diagram of a switched capacitor voltage converter circuit according to still another embodiment of the present invention. The configurations of a zero current estimation circuit 603, a switch control circuit 6011 and a switched capacitor converter 602 shown in FIG. 8A are similar to the embodiment shown in FIG. 2, so the details thereof are not redundantly repeated here. This embodiment shown in FIG. 8A is similar to the embodiment shown in FIG. 2, but is different in that: the control circuit 601 further includes a delay circuit 6012. The delay circuit 6012 is configured to operably maintain (or extend) the zero current estimation signal ZCPD 1 or the zero current estimation signal ZCPD 2 for a delay period Td, so that the first process and the second process are separated from each other by the delay period Td.

Figure 8B:
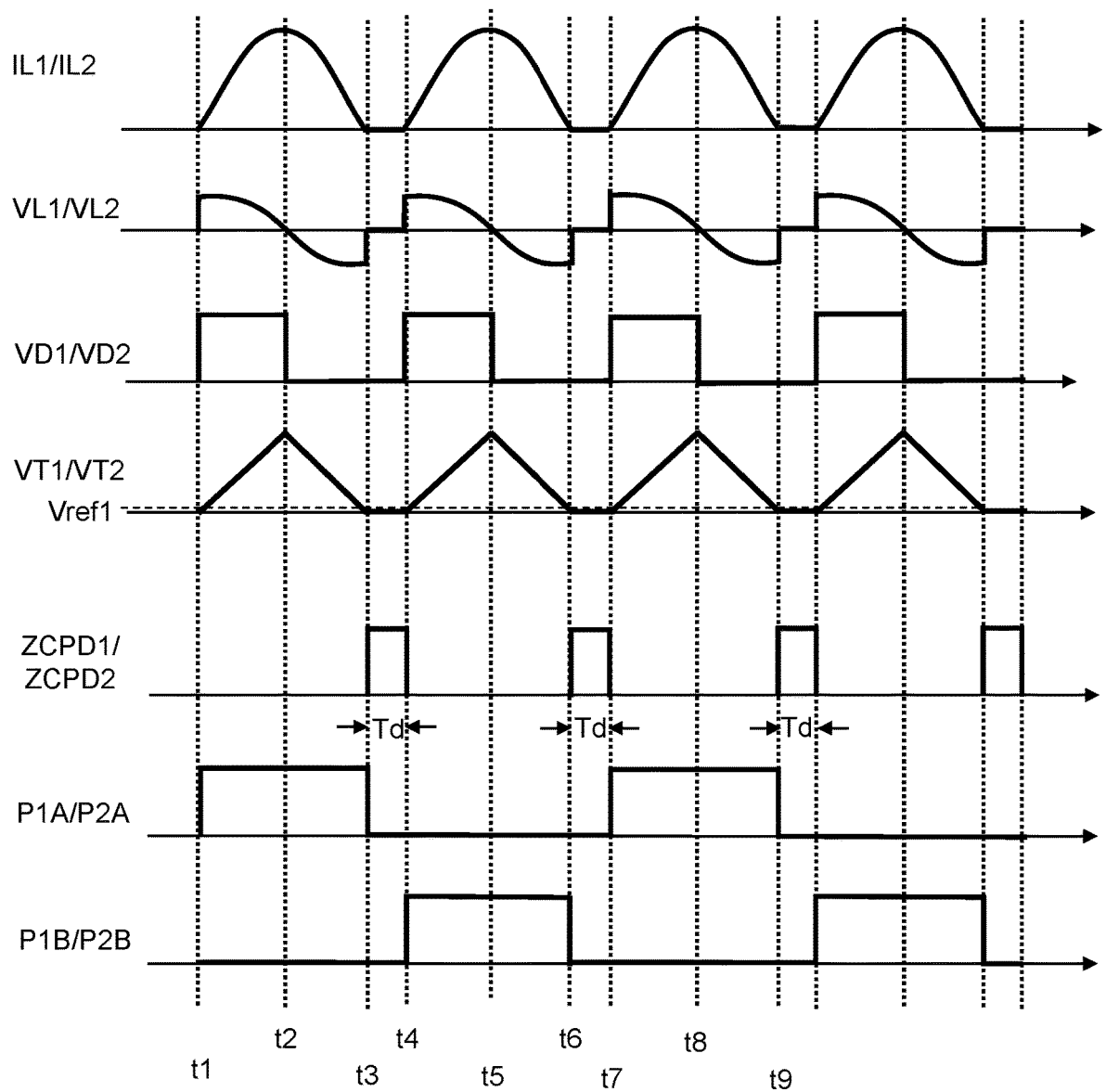
FIG. 8B illustrates waveform diagrams of relevant signals related to the operation of the embodiment shown in FIG. 8A according to this embodiment of the present invention.

FIG. 8B illustrates waveform diagrams of relevant signals related to the operation of the switched capacitor voltage converter circuit 60 shown in FIG. 8A. The first resonant current IL1 or the second resonant current IL2, the inductor voltage VL1 or the inductor voltage VL2, the voltage detection signal VD1 or the voltage detection signal VD2, the voltage VT1 or the voltage VT2, the zero current estimation signal ZCPD 1 or the zero current estimation signal ZCPD 2, the first operation signal P1A or the first operation signal P2A and the second operation signal P1B or the second operation signal P2B are illustrated in FIG. 8B.

Figure 9A:
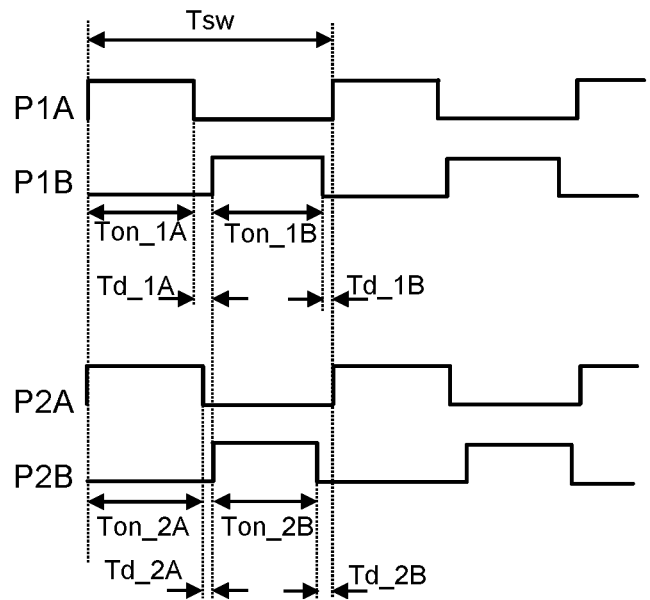
FIG. 9A and FIG. 9B illustrate waveform diagrams of control signals related to the operation of the switched capacitor voltage converter circuit shown in FIG. 2.
Figure 9B:
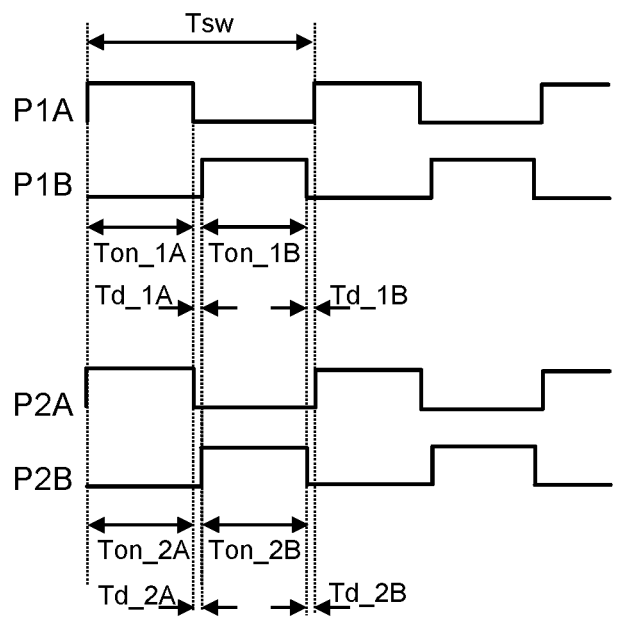

FIG. 9A and FIG. 9B illustrate waveform diagrams of control signals related to the operation of the switched capacitor voltage converter circuit shown in FIG. 2. FIG. 9A illustrate waveform diagrams of the first operation signals P1A and P2A and the second operation signals P1B and P2B related to a situation where the switched capacitor converter 202 shown in FIG. 2 operates in a state that a resonant capacitor C2 and an inductor L2 and a resonant capacitor C3 and an inductor L3 are in an imbalance condition. As shown in FIG. 9A, when the resonant capacitor C2 and the inductor L2 and the resonant capacitor C3 and the inductor L3 are in an imbalance condition, although an ON period Ton_1A of the first operation signal P1A and an ON period Ton_2A of the first operation signal P2A have the same starting time point, the ON period Ton_1A of the first operation signal P1A and the ON period Ton_2A of the first operation signal P2A have a different ending time point. Likewise, although an ON period Ton_1B of the second operation signal P1B and an ON period Ton_2B of the second operation signal P2B have a same starting time point, but the ON period Ton_1B of the second operation signal P1B and the ON period Ton_2B of the second operation signal P2B end at different time points. Under such situation, in one embodiment, the length of the ON period Ton_1A of the first operation signal P1A and the length of the ON period Ton_2B of the second operation signal P2B are configured to be adjustable, so that the ON period Ton_1A of the first operation signal P1A and the ON period Ton_2A of the first operation signal P2A can be adjusted to have the same starting time point and the same ending time point and so that the ON period Ton_1B of the second operation signal P1B and the ON period Ton_2B of the second operation signal P2B can be adjusted to have the same starting time point and the same ending time point. In another embodiment, the switching frequency can be adjusted by adjusting a delay period.

Figure 10:
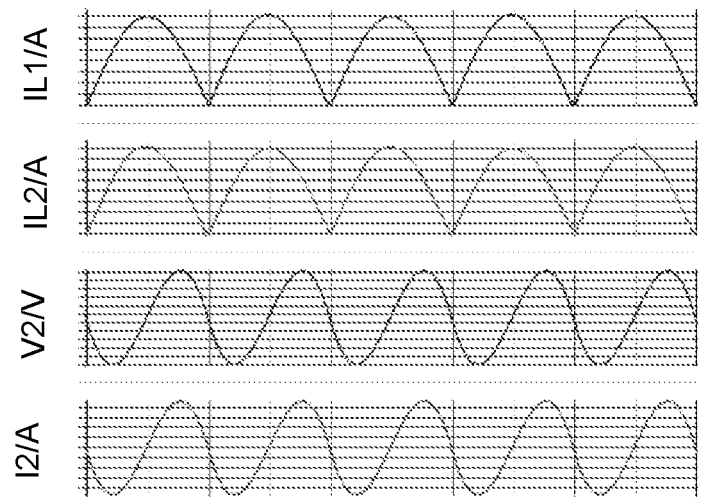
FIG. 10 illustrates waveform diagrams of relevant signals related to a situation where the switched capacitor voltage converter circuit shown in FIG. 2 operates in an ideal resonant state according to still another embodiment of the present invention.
Figure 11:
FIG. 11 illustrates waveform diagrams of relevant signals related to a situation where the switched capacitor voltage converter circuit shown in FIG. 2 operates in a state that a capacitor and an inductor are in an imbalance condition.

FIG. 10 illustrates waveform diagrams of relevant signals related to a situation where the switched capacitor voltage converter circuit shown in FIG. 2 operates in an ideal resonant state according to still another embodiment of the present invention. As shown in FIG. 10, in an ideal resonant state, when the resonant capacitor C2 and the inductor L2 and the resonant capacitor C3 and the inductor L1 are in a balance condition, the waveform indicative of the first resonant current IL1 is entirely aligned with the waveform indicative of the second resonant current IL2. FIG. 11 illustrates waveform diagrams of relevant signals related to a situation where the switched capacitor voltage converter circuit shown in FIG. 2 operates in a state that a capacitor and an inductor are in an imbalance condition. As shown in FIG. 11, when the resonant capacitor C2 and the inductor L2 and the resonant capacitor C3 and the inductor L1 are in an imbalance condition, when the second resonant current IL2 (as illustrated by a black line shown in FIG. 11) has already reached zero, the first resonant current IL1 (as illustrated by a grey line shown in FIG. 11) has not yet reached zero. As a consequence, at a time point when the switches are switched, the second resonant current IL2 has already become a negative current; in this case, the second resonant current IL2 will have a relatively higher peak value and the conduction power loss will be increased.

Figure 12:
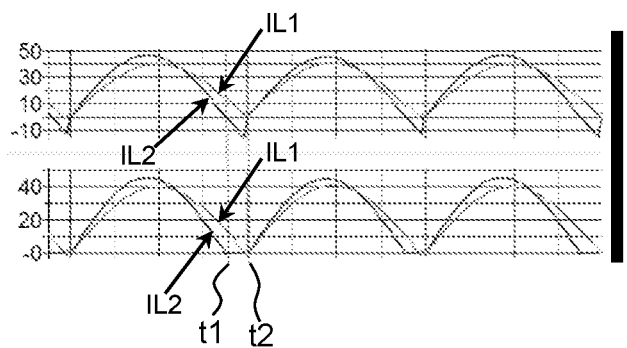
FIG. 12 illustrates waveform diagrams of relevant signals related to a situation where the switched capacitor voltage converter circuit operates in a situation that the switches related to a first resonant current are turned OFF when a first resonant current is zero and the switches related to a second resonant current are turned OFF when a second resonant current is zero according to still another embodiment of the present invention, in comparison with the case of FIG. 11.

FIG. 12 illustrates waveform diagrams of relevant signals related to a situation where the embodiment shown in FIG.

11 operates in a situation that switches related to a first resonant current are turned OFF when a first resonant current is zero and switches related to a second resonant current are turned OFF when a second resonant current is zero according to still another embodiment of the present invention. The upper portion of FIG. 12 is the same as FIG. 11, demonstrating a situation where the first resonant current IL1 and the second resonant current IL2 are in an imbalance condition. The lower portion of FIG. 12 demonstrates a situation wherein the switches corresponding to the first resonant current IL1 and the switches corresponding to the second resonant current IL2 are turned OFF at the time point at which the first resonant current IL1 is zero and at the time point at which the second resonant current IL2 is zero. As shown in FIG. 12, under such circumstance, the second resonant current IL2 does not become a negative current and the peak value is decreased. Please refer to FIG. 12 together with FIG. 8A. In one embodiment, the zero current estimation circuit 603 is configured to operably generate the zero current estimation signal ZCPD 1 and the zero current estimation signal ZCPD 2, respectively, at the time point t2 at which the first resonant current IL1 is zero and/or the time point t1 at which the second resonant current IL2 is zero. The switch control circuit 6011 generates the first operation signals P1A' and P2A' according to the zero current estimation signal ZCPD 1 and the switch control circuit 6011 generates the second operation signals P1B' and P2B' according to the zero current estimation signal ZCPD 2. The delay circuit 6012 modulates a width of a delay period of the first operation signal P2A' and a width of a delay period of the second operation signal P2B', so that the first operation signal P2A and the second operation signal P2B have delay periods but the first operation signal P1A and the second operation signal P1B do not have delay periods. Consequently, in this embodiment, the switches corresponding to the first resonant current IL1 and the switches corresponding to the second resonant current IL2 are turned OFF at the time point at which the first resonant current IL1 is zero and at the time point at which the second resonant current IL2 is zero, respectively. To be more specific, if the second resonant current IL2 is the earlier one to reaches zero (earlier than the first resonant current IL1), after the second resonant current IL2 has reached zero and the switches corresponding to the second resonant current IL2 are turned OFF, the OFF time period is extended by a delay period until the first resonant current IL1 has reached zero and the switches corresponding to the first resonant current IL1 are turned OFF. The waveform of the first resonant current IL1 is similar to that shown in FIG. 4, whereas, the waveform of the second resonant current IL2 is similar to that shown in FIG. 8B.

FIG. 13 illustrates waveform diagrams of relevant signals related to a situation where the embodiment shown in FIG. 11 operates in a situation that switches are both turned OFF when an earlier one of the first resonant current and the second resonant current is zero according to still another embodiment of the present invention. The upper portion of FIG. 13 is the same as FIG. 11, demonstrating a situation where the first resonant current IL1 and the second resonant current IL2 are in an imbalance condition. The lower portion of FIG. 13 demonstrates a situation wherein the switches corresponding to the first resonant current IL1 and the switches corresponding to the second resonant current IL2 are both turned OFF at the time point at which the second resonant current IL2 is zero. As shown in FIG. 13, under such circumstance, the peak value of the second resonant current IL2 is further decreased, as compared to the peak value of the second resonant current IL2 shown in FIG. 12, and the waveform of the first resonant current IL1 is more closer to a square waveform. As a result, a root mean square (rms) of the first resonant current IL1 becomes even lower. Please refer to FIG. 13 together with FIG. 8A. In one embodiment, the zero current estimation circuit 603 is configured to operably generate the zero current estimation signal ZCPD 2 at the time point t3 at which the second resonant current IL2 is zero and to operably generate the zero current estimation signal ZCPD 1 at a time point which is earlier than the time point at which the first resonant current IL1 is zero (e.g., at the time point t3 when the second resonant current IL2 is zero). The switch control circuit 6011 generates the first operation signals P1A' and P2A' according to the zero current estimation signal ZCPD 1 and the switch control circuit 6011 generates the second operation signals P1B' and P2B' according to the zero current estimation signal ZCPD 2. The delay circuit 6012 modulates a width of a delay period of the first operation signal P2A' and a width of a delay period of the second operation signal P2B', so that the first operation signal P2A and the second operation signal P2B have delay periods and so that the first operation signal P1A and the second operation signal P1B do not have delay periods. Consequently, in this embodiment, the switches corresponding to the first resonant current IL1 and the switches corresponding to the second resonant current IL2 are both turned OFF at the time point at which the second resonant current IL2 is zero.

When the control circuit 601 turns OFF the switches Q1~Q10 according to the first operation signals P1A and P2A and the second operation signals P1B and P2B at the time point at which the second resonant current IL2 flowing through the inductor L2 is zero, the first resonant current IL1 flowing through the first inductor L1 keeps freewheeling along a current freewheeling path, whereby the first resonant current IL1 flowing toward the second voltage V2 is in a specific state.

The above-mentioned current freewheeling path can be implemented in various ways. For example, please still refer to FIG. 8A, when the control circuit 601 turns OFF the switches Q1~Q10 according to the first operation signals P1A and P2A and the second operation signals P1B and P2B at the time point at which the second resonant current IL2 flowing through the inductor L2 is zero, the first resonant current IL1 flowing through the first inductor L1 keeps freewheeling by passing through the body diodes (as shown by the dashed line in FIG. 8A) of at least one switch (e.g., switches Q3 and Q10), whereby the first resonant current ILo1 flowing toward the second voltage V2 is in the specific state. The freewheeling path includes the body diodes of the switches Q3 and Q10, wherein the switches Q3 and Q10 are in OFF state.

In another implementation of the current freewheeling path, for another example, please still refer to FIG. 8A, when the control circuit 601 turns OFF the switches Q1~Q2 and the switches Q4~Q9 and turns ON the switches Q3 and Q10 according to the first operation signals P1A and P2A and the second operation signals P1B and P2B at the time point at which the second resonant current IL2 flowing through the inductor L2 is zero, the first resonant current IL1 flowing through the first inductor L1 keeps freewheeling by passing through the switches Q3 and Q10, whereby the first resonant current ILo1 flowing toward the second voltage V2 is in a specific state. The freewheeling path includes the body diodes of the switches Q3 and Q10, wherein the switches Q3 and Q10 are in ON state.

In one embodiment, the above-mentioned specific state is that: the first resonant current ILo1 flowing toward the second voltage V2 is a non-resonant current. In one preferred embodiment, the above-mentioned state is that: the first resonant current ILo1 stops flowing toward the second voltage V2 or the first resonant current ILo1 flowing toward the second voltage V2 is a linear ramp current (please refer to FIG. 13 for the latter). In this embodiment, as shown in FIG. 8A and FIG. 13, the first resonant current ILo1 flowing toward the second voltage V2 is a linear ramp current. In one embodiment, after the linear ramp current decreases to zero or near zero, a part of the switches are turned ON, to execute the first process and/or the second process. In another embodiment, after a delay period from when the linear ramp current starts decreasing and earlier than a time point when the linear ramp current reaches zero, a part of the switches are turned ON, to execute the first process and/or the second process.

In one embodiment, when the control circuit 601 turns OFF the switches Q1~Q10 according to the first operation signals P1A and P2A and the second operation signals P1B and P2B at the time point at which the second resonant current IL2 flowing through the resonant inductor L2 is zero, one end of the resonant inductor L1 is connected through the body diodes (as shown by the dashed line in FIG. 8A) of at least one switch (e.g., switches Q3 and Q10) to a DC potential, so that the first resonant current ILo1 flowing toward the second voltage V2 is a linear ramp current. In one embodiment, the current variation speed of the above-mentioned linear ramp current is greater than the current variation speed of the first resonant current IL1 in a resonant mode. For example, the resonant inductor L1 is connected in series between the second voltage V2 and the ground potential through the body diodes in the switches Q3 and Q10, so that the first resonant current IL1 can freewheel according to the current direction shown by the dashed arrow in FIG. 8A, so that the first resonant current ILo1 flowing toward the second voltage V2 is a linear ramp current.

FIG. 14 illustrates waveform diagrams of relevant signals related to a situation where the switched capacitor voltage converter circuit operates in a situation that the switches are turned OFF before a time point at which one of the first resonant current and the second resonant current resonant current is zero according to still another embodiment of the present invention. As shown in FIG. 14, under such circumstance, the peak value of the second resonant current IL2 and the peak value of the first resonant current IL1 is decreased and the waveform of the second resonant current IL2 and the waveform of the first resonant current IL1 are more closer to a square waveform. As a result, a root mean square (rms) of the first resonant current IL1 and of the second resonant current IL2 become even lower.

Please refer to FIG. 14 together with FIG. 8A. In another embodiment, the zero current estimation circuit 603 is configured to operably generate the zero current estimation signal ZCPD 2 at a time point (e.g., the time point t4) which is earlier than the time point at which the second resonant current IL2 is zero and the zero current estimation circuit 603 is configured to operably generate the zero current estimation signal ZCPD 1 at a time point (e.g., the time point t4, which is even earlier than the time point at which the second resonant current IL2 is zero) which is earlier than the time point at which the first resonant current IL1 is zero. The switch control circuit 6011 generates the first operation signals P1A' and P2A' according to the zero current estimation signal ZCPD 1 and the switch control circuit 6011 generates the second operation signals P1B' and P2B' according to the zero current estimation signal ZCPD 2. The delay circuit 6012 modulates a width of a delay period of the first operation signal P2A' and a width of a delay period of the second operation signal P2B', so that the first operation signal P2A and the second operation signal P2B have delay periods and so that the first operation signal P1A and the second operation signal P1B do not have delay periods. Consequently, in this embodiment, at a time point (e.g., the time point t4) before the second resonant current IL2 is zero, the switches corresponding to the first resonant current IL1 and the switches corresponding to the second resonant current IL2 are both turned OFF. The resonant current IL1 freewheels and the second resonant current IL2 freewheels in a way similar to that described with reference to FIG. 13 and FIG. 8A, and please refer to the detailed description of FIG. 13 and FIG. 8A.

FIG. 15 shows a comparison table among embodiments shown in FIG. 10 to FIG. 14. According to FIG. 15, the condition 2 shown in FIG. 11 has the largest conduction power loss. However, the present invention can effectively reduce the conduction power loss by the following approaches: (1) turning OFF the switches corresponding to one of the resonant currents at a time point which is earlier than the time point at which the one resonant current reaches zero (i.e., the condition 5 shown in FIG. 14); or, (2) turning OFF the switches corresponding to one of the resonant currents at a time point which is exactly the time point at which the one resonant current reaches zero reaches zero (i.e., the condition 4 shown in FIG. 13); or, (3) turning OFF the switches corresponding to the two resonant currents at the time point at which the two resonant currents both reach zero (i.e., the condition 3 shown in FIG. 12).

Figure 16A:
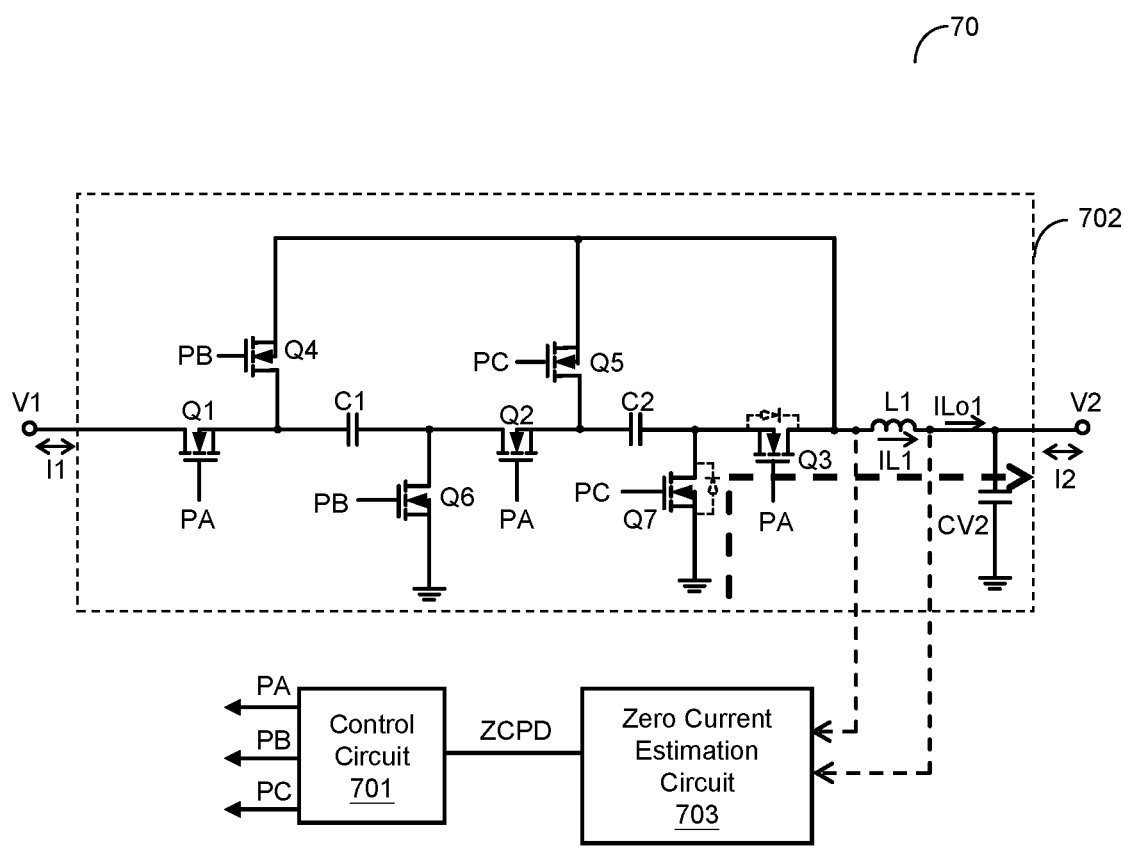
FIG. 16A shows a schematic circuit diagram of a switched capacitor voltage converter circuit according to still another embodiment of the present invention.

FIG. 16A is a schematic circuit diagram showing a switched capacitor voltage converter circuit according to another embodiment of the present invention. As shown in FIG. 16A, the switched capacitor voltage converter circuit 70 of the present invention includes resonant capacitors C1~C2, switches Q1~Q7, and an inductor L1. The switches Q1~Q2 are connected in series with the corresponding resonant capacitors C1~C2, respectively, and the switch Q3 is connected in series with the inductor L1.

The switches Q1~Q7 can switch the coupling relationships of the resonant capacitors C1~C2 with the inductor L according to corresponding operation signals. In the first process, according to the first operation signal GA, the switches Q1~Q3 are turned ON and the switches Q4~Q7 are turned OFF, so that the resonant capacitors C1~C2 are connected in series with each other, and the series connection of the resonant capacitors C1~C2 is further connected in series with the inductor L between the first voltage V1 and second voltage V2, to form a first current path for the charging process. In the second process, according to the second operation signal GB, the switches Q4~Q7 are turned ON and the switches Q1~Q3 are turned OFF, so that the resonant capacitors C1~C2 are connected in parallel with each other, and the parallel connection of the resonant capacitors C1~C2 is further connected in series with the inductor L between the second voltage V2 and ground potential, to form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1. In this embodiment, the DC bias voltage of each resonant capacitor C1~C2 is the second voltage V2; therefore, the resonant capacitors C1~C2 in this embodiment only need to withstand a lower-rated voltage, so a capacitor with a smaller size can be used.

The control circuit 701 and the zero current estimation circuit 703 of this embodiment can be implemented by using the control circuit structure and the zero current estimation circuit structure of FIG. 2, FIG. 3 and FIG. 8A; please refer to the detailed descriptions of FIG. 2, FIG. 3 and FIG. 8A. The resonant current IL1 freewheels in a way that is similar to that described with reference to FIG. 13 and FIG. 8A, and please refer to the detailed description of FIG. 13 and FIG. 8A.

In one embodiment, the voltage conversion ratio between the first voltage V1 and the second voltage V2 of the switched capacitor voltage converter circuit 70 can be 3:1 or 2:1.

Figure 16B:
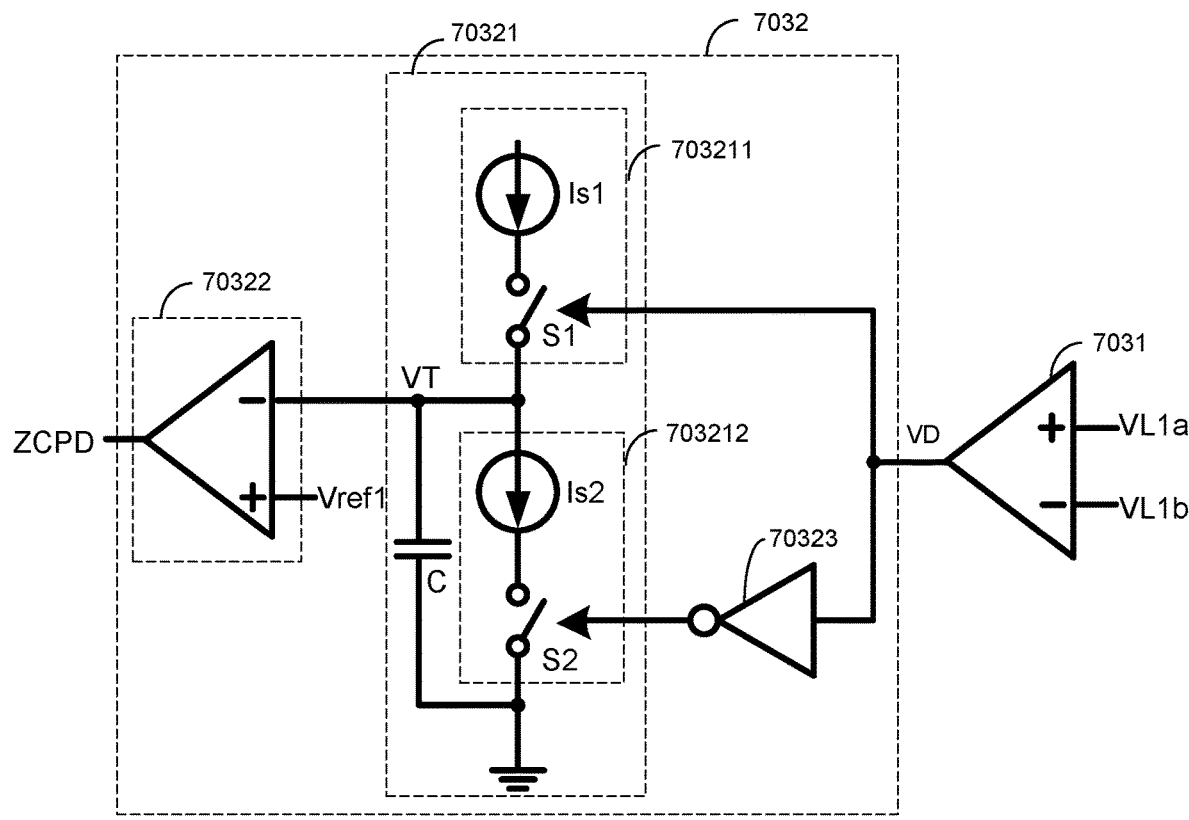
FIG. 16B shows a schematic circuit diagram of a zero current estimation circuit of a switched capacitor voltage converter circuit according to another embodiment of the present invention.

FIG. 16B shows a schematic circuit diagram of a zero current estimation circuit of a switched capacitor voltage converter circuit according to another embodiment of the present invention. This embodiment shown in FIG. 16B is similar to the embodiment shown in FIG. 7, but is different in that: this embodiment shown in FIG. 16B only includes one set of a voltage detection circuit 7031 and a timer 7032, rather than including two sets of voltage detection circuits and timers as in the embodiment shown in FIG. 7.

Figure 17:
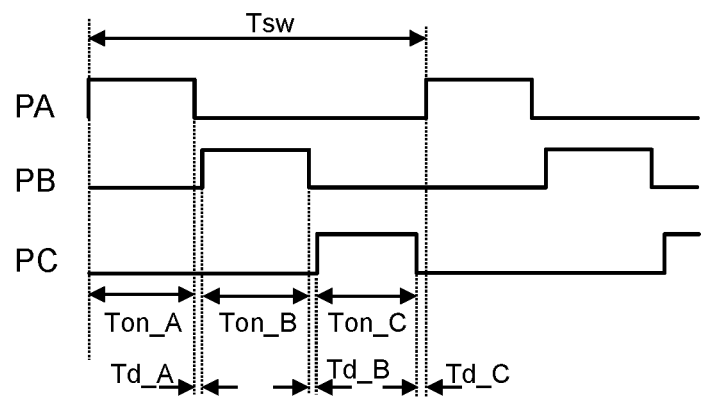
FIG. 17 illustrates waveform diagrams of control signals related to a situation where the switched capacitor voltage converter circuit shown in FIG. 16A operates in an alternating discharging operation according to an embodiment of the present invention.

FIG. 17 illustrates waveform diagrams of control signals related to a situation where the switched capacitor voltage converter circuit shown in FIG. 16A performs discharging operations alternatingly (i.e. plural second processes) according to an embodiment of the present invention. When a switched capacitor converter 70 of FIG. 16A discharges alternatingly according to the second operation signals PB and PC, the waveform diagrams of control signals are as shown in FIG. 17. Please refer to FIG. 17 together with FIG. 16A. In this embodiment, the zero current estimation circuit 703 is configured to operably generate the zero current estimation signal ZCPD at a time point earlier than the time point at which the first resonant current IL1 is zero. The control circuit 701 generates a first operation signal PA and second operation signals PB and PC according to the zero current estimation signal ZCPD. As a result, in this embodiment, at a time point which is earlier than the time point at which the first resonant current IL1 is zero, the switches corresponding to the first resonant current IL1 are turned OFF.

Figure 18:
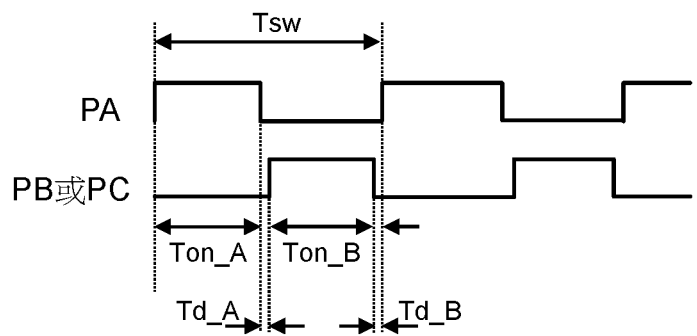
FIG. 18 illustrates waveform diagrams of control signals related to a situation where the switched capacitor voltage converter circuit shown in FIG. 16A operates in a simultaneous discharging operation according to another embodiment of the present invention.

FIG. 18 illustrates waveform diagrams of control signals related to a situation where the switched capacitor voltage converter circuit shown in FIG. 16A simultaneously performs discharging operations (i.e. plural second processes) according to another embodiment of the present invention. When a switched capacitor converter 70 of FIG. 16A discharges simultaneously according to the second operation signals PB and PC, the waveform diagrams of control signals are as shown in FIG. 18. Please refer to FIG. 18 together with FIG. 16A. In this embodiment, the zero current estimation circuit 703 is configured to operably generate the zero current estimation signal ZCPD at a time point which is earlier than the time point at which the first resonant current IL1 is zero. The control circuit 701 generates a first operation signal PA and second operation signals PB and PC according to the zero current estimation signal ZCPD. As a result, in this embodiment, at a time point which is earlier than the time point at which the first resonant current IL1 is zero, the switches corresponding to the first resonant current IL1 are turned OFF.

Figure 19:
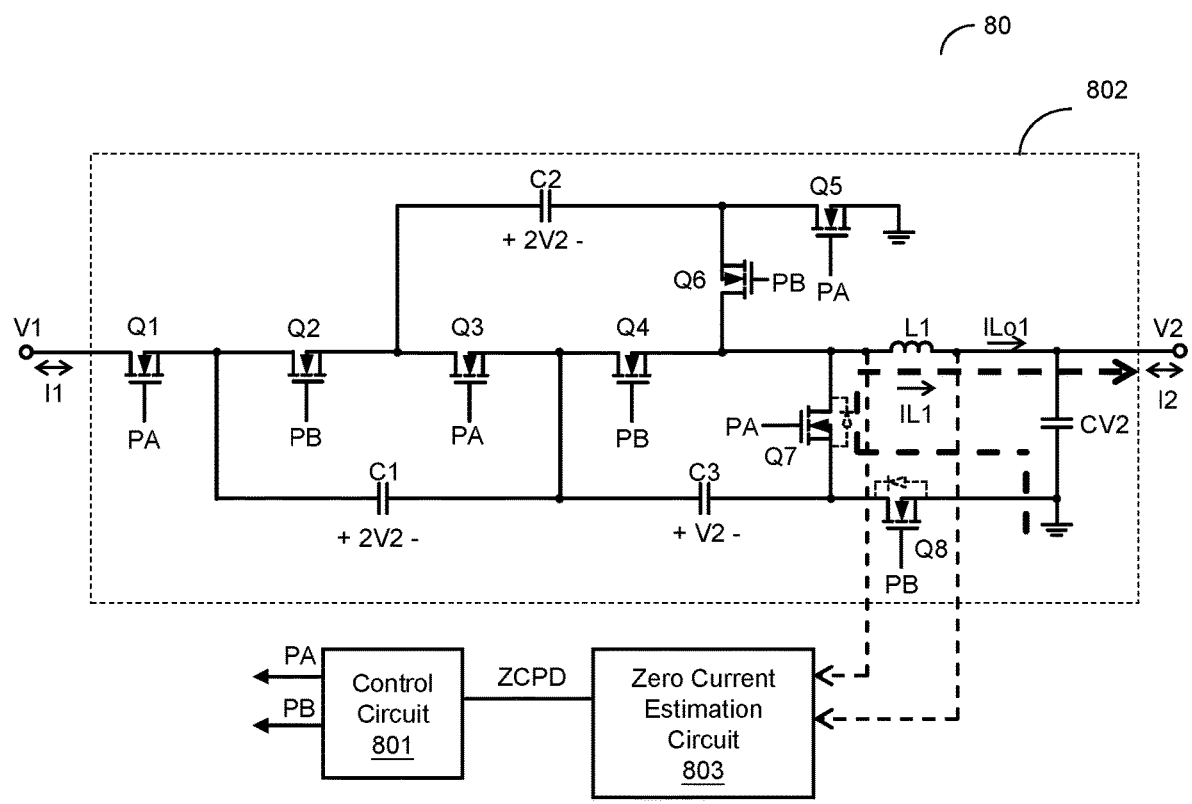
FIG. 19 shows a schematic circuit diagram of a switched capacitor voltage converter circuit according to still another embodiment of the present invention.

FIG. 19 shows a schematic circuit diagram of a switched capacitor voltage converter circuit according to another embodiment of the present invention. As shown in FIG. 19, the switched capacitor voltage converter circuit 80 of the present invention includes a resonant capacitor C3, non-resonant capacitors C1~C2, switches Q1~Q8, and an inductor L1.

The switches Q1~Q8 can switch the coupling relationships of the resonant capacitor C3 and non-resonant capacitors C1~C2 with the inductor L1 according to corresponding operation signals. In the first process, according to the first operation signal GA, the switches Q1, Q3, Q5, and Q7 are turned ON, whereas, the switches Q2, Q4, Q6, and Q8 are turned OFF, whereby the non-resonant capacitor C1, resonant capacitor C3, and inductor L1 are connected in series between the first voltage V1 and second voltage V2, and one end of the non-resonant capacitor C2 is coupled between the non-resonant capacitor C1 and resonant capacitor C3, whereas, the other end of non-resonant capacitor C2 is coupled to the ground potential, to form a first current path for the charging process. In the second process, according to the second operation signal GB, the switches Q2, Q4, Q6, and Q8 are turned ON, whereas, the switches Q1, Q3, Q5, and Q7 are turned OFF, whereby the resonant capacitor C3 and inductor L are connected in series between the second voltage V2 and ground potential to form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 801 and the zero current estimation circuit 803 of this embodiment can be implemented by using the control circuit structure and the zero current estimation circuit structure of FIG. 2, FIG. 3 and FIG. 8; please refer to the detailed descriptions of FIG. 2, FIG. 3 and FIG. 8A. The resonant current IL1 freewheels in a way that is similar to that described with reference to FIG. 13 and FIG. 8A, and please refer to the detailed description of FIG. 13 and FIG. 8A.

Figure 20:
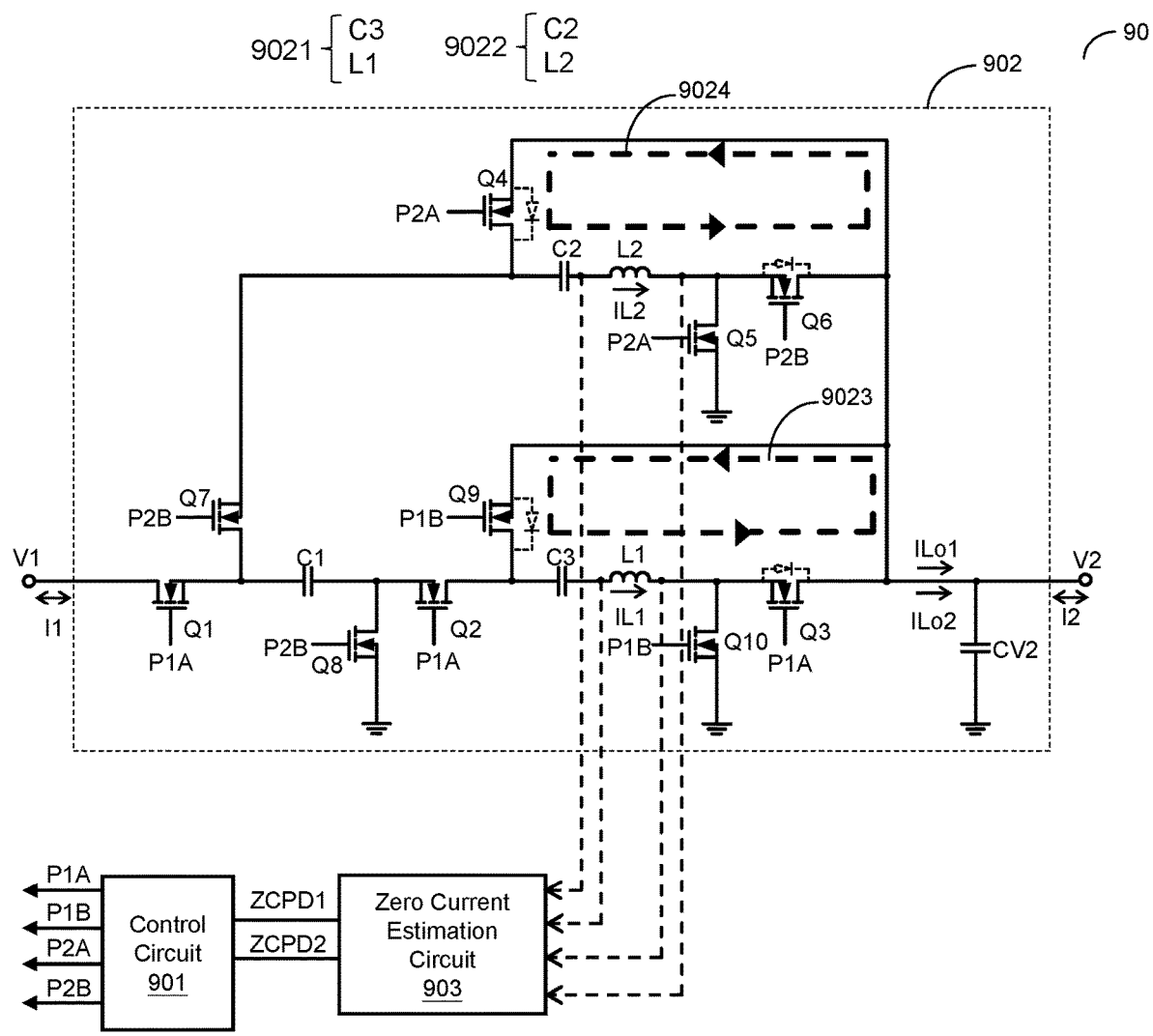
FIG. 20 shows a schematic circuit diagram of a switched capacitor voltage converter circuit according to still another embodiment of the present invention.

FIG. 20 illustrates a schematic circuit diagram of a switched capacitor voltage converter circuit in accordance with another embodiment of the present invention. The switched capacitor 902 of this embodiment is similar to the switched capacitor converter 202 of the embodiment shown in FIG. 2, but is different in that: the inductor L1 of the switched capacitor 902 is directly electrically connected in series to the resonant capacitor C3, so that the resonant capacitor C3 and the inductor L1 constitutes a resonant tank 9021. The inductor L2 of the switched capacitor 902 is directly electrically connected in series to the resonant capacitor C2, so that the resonant capacitor C2 and the inductor L2 constitutes a resonant tank 9022. In one embodiment, during a first process, the switches Q1~Q10 are configured to operably control the resonant tank 9021 and the non-resonant capacitor C1 to be electrically connected in series between the first voltage V1 and the second voltage V2, and the switches Q1~Q10 are configured to operably control the resonant tank 9022 to be electrically connected in parallel to the second voltage V2. On the other hand, during a second process, the switches Q1~Q10 are configured to operably control the resonant tank 9022 and the non-resonant capacitor C1 to be electrically connected in series between the second voltage V2 and a ground voltage level, and the switches Q1~Q10 are configured to operably control the resonant tank 9021 to be electrically connected in parallel to the second voltage V2. The switched capacitor 902 executes power conversion between the first voltage V1 and the second voltage V2 through periodically conducting the above-mentioned operations in resonant operation. In regard to operation details of the switches Q1~Q10, please refer to the embodiment shown in FIG. 2.

The control circuit 901 and the zero current estimation circuit 903 of this embodiment can be implemented by using the control circuit structure and the zero current estimation circuit structure of FIG. 2, FIG. 3 and FIG. 8; please refer to the detailed descriptions of FIG. 2, FIG. 3 and FIG. 8A. As shown in FIG. 20, when the control circuit 901 controls the switches Q1~Q10 to be non-conductive according to the first operation signals P1A and P2A and the second operation signals P1B and P2B at a time point which is earlier than the time point at which the second resonant current IL2 flowing through the inductor L2 is zero and/or the time point at which the first resonant current IL1 flowing through the inductor L1 is zero, the first resonant current IL1 and the second resonant current IL2 flowing through the corresponding inductors L1 and L2 respectively pass through the body diodes (as shown by the dashed line in FIG. 20) of at least one switch (e.g., switches Q9 and Q3, and switches Q4 and Q6), and the first resonant current IL1 and the second resonant current IL2 continue freewheeling respectively along the closed-loops 9023 and 9024 formed by the resonant tanks 9021 and 9022 and the body diodes (as shown by the dashed line in FIG. 20) of at least one switch (e.g., switches Q9 and Q3 and switches Q4 and Q6), so that the first resonant current ILo1 and the second resonant current ILo2 stop flowing toward the second voltage V2. As shown in FIG. 20, at least one resonant capacitor C3 and at least one inductor L1 form the resonant tank 9021, and at least one resonant capacitor C2 and at least one inductor L2 form the resonant tank 9022. In this case, the closed-loop currents (i.e. the first resonant current IL1 and the second resonant current IL2) do not result in a net current flowing into or out of the non-resonant capacitor CV2 (which can be regarded as the output capacitor).

More specifically, by means of the conduction of the body diodes in the switches Q9 and Q3, the first resonant current IL1 flowing through the corresponding inductor L1 keeps freewheeling along the closed-loop 9023 formed by the resonant tank 9021 and the body diodes in the switches Q9 and Q3, so that the first resonant current ILo1 stops flowing toward the second voltage V2. By means of the conduction of the body diodes in the switches Q4 and Q6, the second resonant current IL2 flowing through the corresponding inductor L2 keeps freewheeling along the closed-loop 9024 formed by the resonant tank 9022 and the body diodes in the switches Q4 and Q6, so that the second resonant current ILo2 stops flowing toward the second voltage V2.

Figure 21:
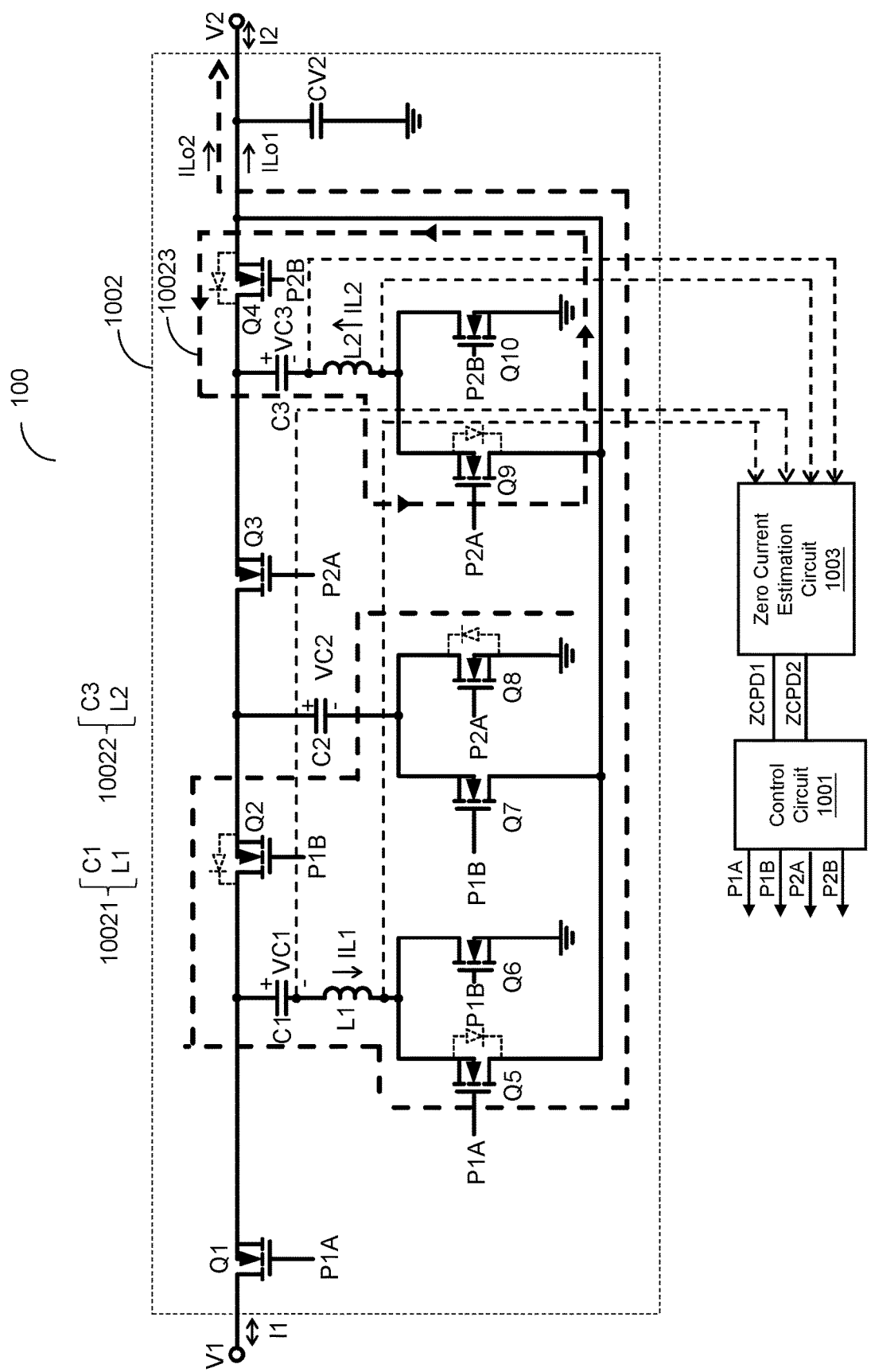
FIG. 21 shows a schematic circuit diagram of a switched capacitor voltage converter circuit according to still another embodiment of the present invention.

FIG. 21 shows a schematic circuit diagram of a switched capacitor voltage converter circuit according to another embodiment of the present invention. As shown in FIG. 21, the switched capacitor voltage converter circuit 100 includes resonant capacitors C1 and C3, at least one non-resonant capacitor C2, switches Q1~Q10, resonant inductors L1 and L2, and a control circuit 1001, and a zero current estimation circuit 1003.

As shown in FIG. 21, in one embodiment, the control circuit 1001 is configured to operably generate first operation signals PTA and P2A corresponding to a first resonant process and is configured to operably generate second operation signals P1B and P2B corresponding to a second resonant process, so as to operate the switches Q1~Q10 to switch electrical connection relationships of the resonant capacitors C1 and C3 and the at least one non-resonant capacitor C2. The switched capacitor voltage converter circuit 100 includes at least one resonant tank (e.g., resonant tanks 10021 and 10022), wherein the resonant tank 10021 includes the resonant capacitor C1 and the resonant inductor L1 which are connected in series to each other, whereas, the resonant tank 1503 includes the resonant capacitor C3 and the resonant inductor L2 which are connected in series to each other. The switches Q1~Q10 are coupled to the at least one resonator (e.g., resonant tanks 10021 and 10022). The switches Q1~Q10 are configured to operably switch electrical connection relationships of the resonant tanks 10021 and 10022 according to the first operation signals P1A and P2A and the second operation signals P1B and P2B in correspondence to the first resonant process and the second resonant process, respectively. In the first resonant process, a resonant charging operation is performed on the resonant tanks 10021 and 10022. In a second resonant process, a resonant discharging operation is performed on the resonant tanks 10021 and 10022. The at least one non-resonant capacitor C2 is coupled to the at least one resonator (e.g., resonant tanks 10021 and 10022). The electrical connection relationship of the non-resonant capacitor C2 with the at least one resonator (e.g., resonant tanks 10021 and 10022) is controlled according to the first operation signals P1A and P2A and the second operation signals P1B and P2B. The voltage across the non-resonant capacitor C2 has a constant ratio to the first voltage V1 of the first voltage V1. For example, in this embodiment, the voltage across the at least one non-resonant capacitor C2 is ½ of the first voltage V1. The first resonant process and the second resonant process are performed in a repeated, alternating manner, in different time periods rather than concurrently, to convert the first voltage V1 to the second voltage V2 or to convert the second voltage V2 to the first voltage V1. The first operation signals P1A and P2A and the second operation signals P1B and P2B have respective ON periods which do not overlap one another, so that the first resonant process and the second resonant process do not overlap each other.

In the first resonant process, according to the first operation signals P1A and P2A, the switches Q1, Q3, Q5, Q8 and Q9 are controlled to be ON, whereas, the switches Q2, Q4, Q6, Q7 and Q10 are controlled to be OFF, so that a series connection of the resonant capacitor C1 of the resonant tank 1502 and the resonant inductor L1 is formed between the first voltage V1 and the second voltage V2 and so that a series connection of the non-resonant capacitor C2 and the resonant capacitor C3 and the resonant inductor L2 of the resonant tank 1503 is formed between a ground voltage level and the second voltage V2, and to thereby charge the resonant capacitors C1 and C3 and to thereby discharge the non-resonant capacitor C2. In the second resonant process, according to the second operation signals P1B and P2B, the switches Q2, Q4, Q6, Q7 and Q10 are controlled to be ON, whereas, the switches Q1, Q3, Q5, Q8 and Q9 are controlled to be OFF, so that a series connection of the non-resonant capacitor C2 and the resonant capacitor C1 and the resonant inductor L1 of the resonant tank 1502 is formed between a ground voltage level and the second voltage V2 and so that a series connection of the resonant capacitor C3 and the resonant inductor L2 of the resonant tank 1503 is formed between a ground voltage level and the second voltage V2, and to thereby discharge the resonant capacitors C1 and C3 and to thereby charge the non-resonant capacitor C2.

In regard to how the resonant tanks 10021 and 10022 of the switched capacitor voltage converter circuit 100 shown in FIG. 21 operate, this is well known to those skilled in the art, so the details thereof are not redundantly explained here.

The control circuit 1001 and the zero current estimation circuit 1003 of this embodiment can be implemented by using the control circuit structure and the zero current estimation circuit structure of FIG. 2, FIG. 3 and FIG. 8; please refer to the detailed descriptions of FIG. 2, FIG. 3 and FIG. 8A. As shown in FIG. 21, when the control circuit 1001 controls the switches Q1~Q10 to be non-conductive according to the first operation signals P1A and P2A and the second operation signals P1B and P2B at a time point which is earlier than the time point at which the second resonant current IL2 flowing through the inductor L2 is zero and/or the time point at which the first resonant current IL1 flowing through the inductor L1 is zero, one end of the resonant inductor L1 is connected through the body diodes (as shown by the dashed line in FIG. 21) of at least one switch (e.g., switches Q8 and Q2) to a DC potential, so that the first resonant current ILo1 flowing toward the second voltage V2 is a linear ramp current. For example, the resonant inductor L1 is connected in series between the second voltage V2 and the ground potential through the body diodes in the switches Q8, Q2, and Q5 so that the first resonant current IL1 can freewheel according to the current direction shown by the dashed arrow in FIG. 21. When the control circuit 1001 controls the switches Q1~Q10 to be non-conductive according to the first operation signals P1A and P2A and the second operation signals P1B and P2B at a time point which is earlier than the time point at which the second resonant current IL2 flowing through the inductor L2 is zero and/or the time point at which the first resonant current IL1 flowing through the inductor L1 is zero, the second resonant current IL2 flowing through the inductor L2 is conducted by the body diodes (as shown by the dashed line in FIG. 21) of at least one switch (e.g., switches Q4 and Q9), so as to keep freewheeling along the closed-loop 10023 formed by the resonant tank 10022 and the body diodes (as shown by the dashed line in FIG. 21) of at least one switch (e.g., switches Q4 and Q9), so that the second resonant current ILo2 stops flowing toward the second voltage V2. In this case, the closed-loop current (i.e. the second resonant current IL2) does not result in a net current flowing into or out of the non-resonant capacitor CV2 (which can be regarded as the output capacitor).

Figure 22:
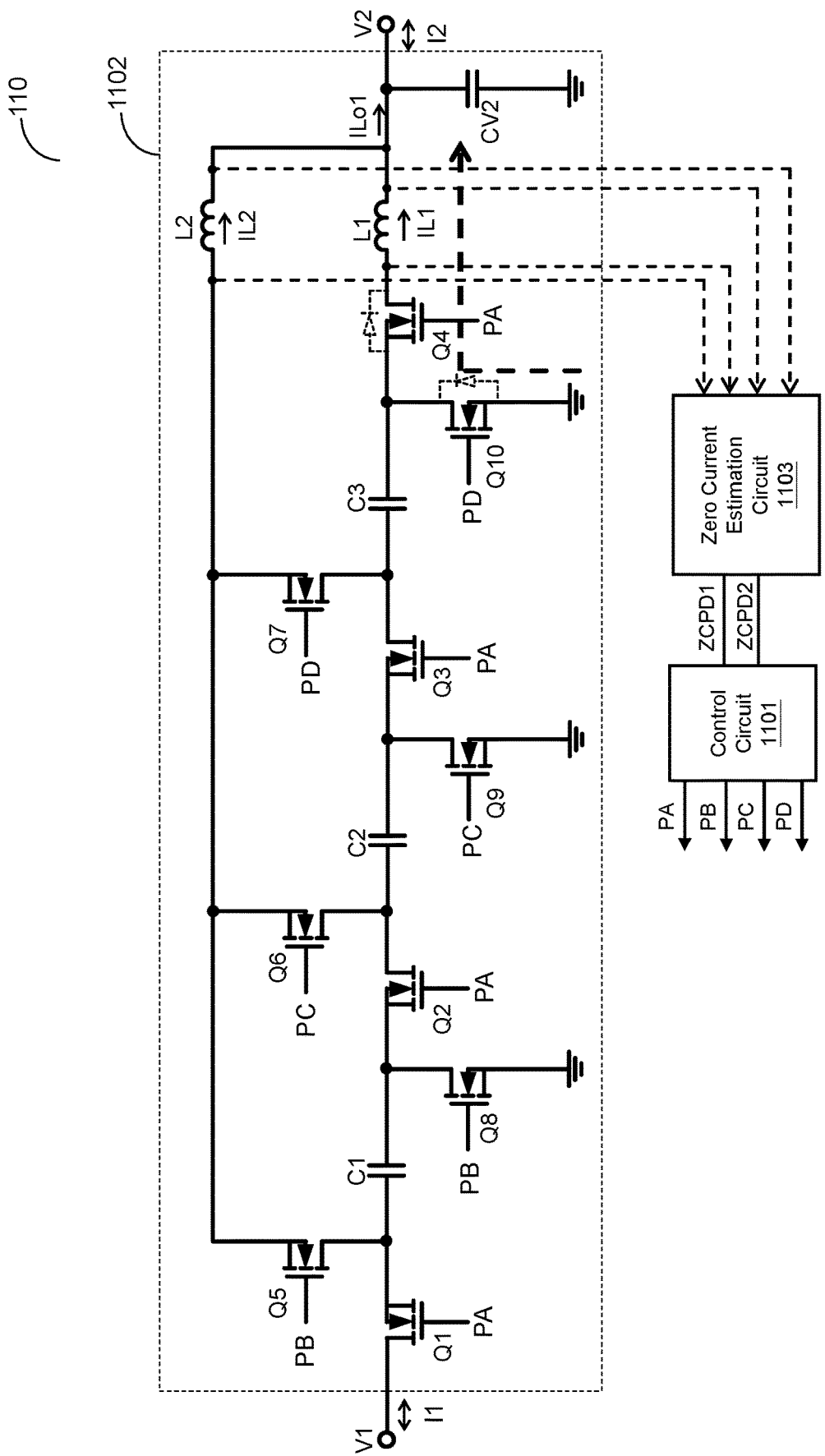
FIG. 22 shows a schematic circuit diagram of a switched capacitor voltage converter circuit according to still another embodiment of the present invention.

FIG. 22 shows a schematic circuit diagram of a switched capacitor voltage converter circuit according to another embodiment of the present invention. In this embodiment, because plural resonant capacitors share one single charging inductor or one single discharging inductor, regardless what the number of the resonant capacitors is, this embodiment only needs to employ one single charging inductor and one single discharging inductor, so that the required number for the inductor can be reduced. As shown in FIG. 22, the switched capacitor voltage converter circuit 110 of the present invention comprises: resonant capacitors C1~C3, switches Q1~Q10, and inductors L1~L3. The switches Q1, Q2 and Q3 are connected in series to the corresponding resonant capacitors C1, C2 and C3, respectively. The switch Q4 is connected in series to the inductor L1. Certainly, it should be understood that the implementation of the number of the capacitors of the switched capacitor voltage converter circuit as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit can be any plural number other than three.

The switches Q1~Q10 can switch the coupling relationships of the resonant capacitors C1~C3 with the inductor L1 and the inductor L2 according to corresponding operation signals. In the first process, according to the first operation signal PA, the switches Q1~Q4 are turned ON and the switches Q5~Q10 are turned OFF, so that resonant capacitors C1~C3 are connected in series with each other, and the series connection of the resonant capacitors C1~C3 is further connected in series with the inductor L1 between the first voltage V1 and second voltage V2, to form a first current path for the charging process. In the second process, according to the second operation signals PB, PC and PD, the switches Q5~Q10 are turned ON and the switches Q1~Q4 are turned OFF, so that the resonant capacitors C1~C3 are connected in parallel with each other, and the parallel connection of the resonant capacitors C1~C3 is further connected in series with the inductor L2 between the second voltage V2 and ground potential, to form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1. In this embodiment, the DC bias voltage of each resonant capacitor C1~C3 is the second voltage V2; therefore, the resonant capacitors C1~C3 in this embodiment only need to withstand a lower-rated voltage, so a capacitor with a smaller size can be used.

The control circuit 1101 and the zero current estimation circuit 1103 of this embodiment can be implemented by using the control circuit structure and the zero current estimation circuit structure of FIG. 2, FIG. 3 and FIG. 8; please refer to the detailed descriptions of FIG. 2, FIG. 3 and FIG. 8A. The resonant current IL1 freewheeling is similar to that described with reference to FIG. 13 and FIG. 8A, and please refer to the detailed description of FIG. 13 and FIG. 8A.

In one embodiment, the above-mentioned first process has a first resonant frequency and the above-mentioned second process has a second resonant frequency. In one embodiment, the first resonant frequency and the second resonant frequency are the same. In another embodiment, the first resonant frequency and the second resonant frequency are different from each other. In one embodiment, the inductance of the inductor L1 and the inductance of the inductor L2 are the same. In another embodiment, the inductance of the inductor L1 and the inductance of the inductor L2 are different from each other.

Figure 23:
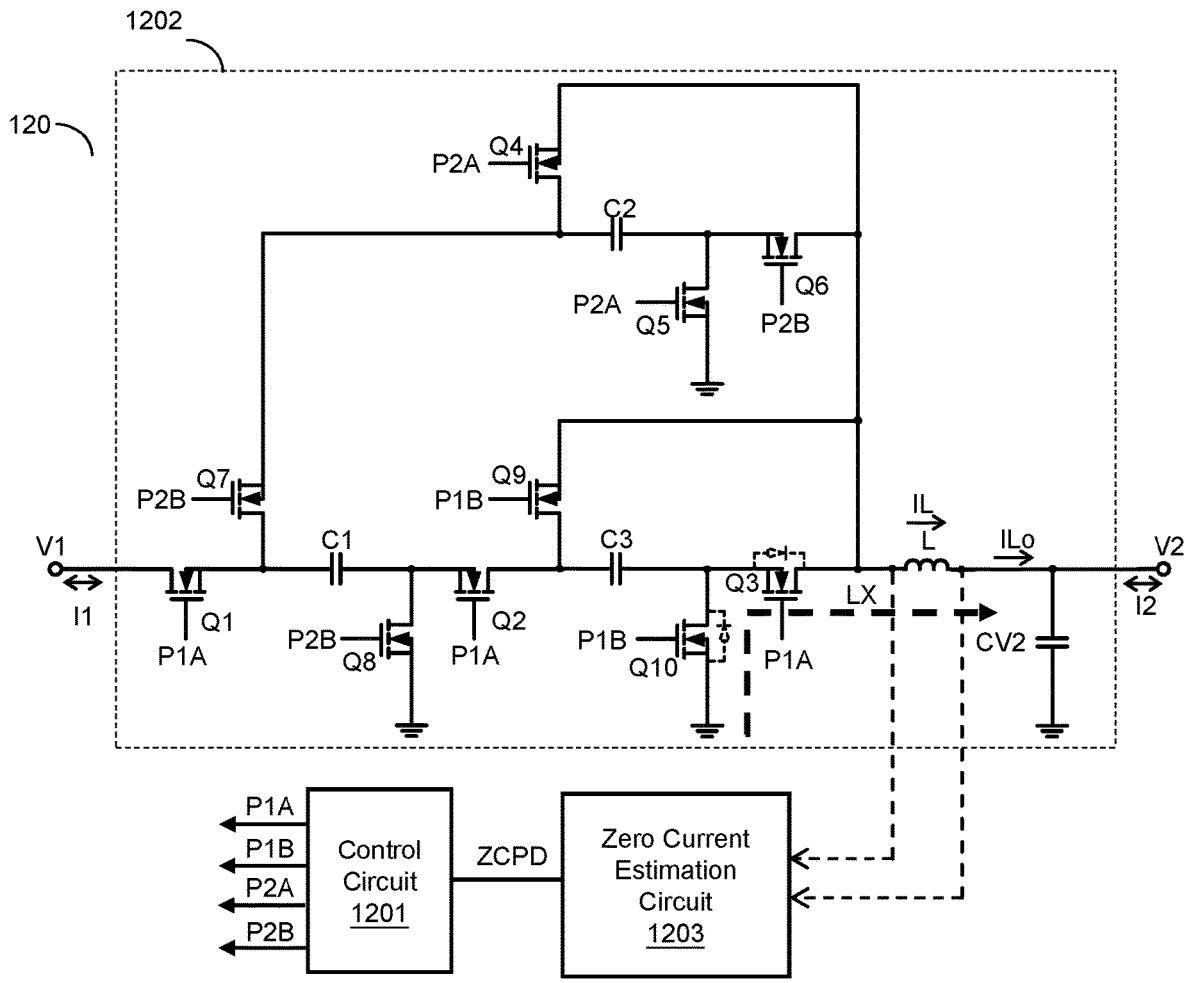
FIG. 23 shows a schematic circuit diagram of a switched capacitor voltage converter circuit according to still another embodiment of the present invention.

FIG. 23 illustrates a schematic circuit diagram of a switched capacitor voltage converter circuit in accordance with still another embodiment of the present invention. The switched capacitor converter 1202 of this embodiment is similar to the switched capacitor converter 202 of the embodiment shown in FIG. 2, but is different in that: the switched capacitor converter 1202 shares an inductor L, and the inductor L is coupled between the second voltage V2 and the switching node LX. During the first process, the switches Q1~Q10 control the non-resonant capacitor C1 and the resonant capacitor C3 to be electrically connected in series to the inductor L via the switching node LX, and the series circuit formed by the non-resonant capacitor C1, the resonant capacitor C3 and the inductor L is electrically connected in series between the first voltage V1 and the second voltage V2; and the switches Q1~Q10 control the resonant capacitor C2 to be electrically connected in series to the inductor L via the switching node LX, and the series circuit formed by the resonant capacitor C2 and the inductor L is electrically connected in parallel to the second voltage V2. On the other hand, during the second process, the switches Q1~Q10 control the resonant capacitor C2 and the non-resonant capacitor C1 to be electrically connected in series to the inductor L via the switching node LX, and the series circuit formed by the resonant capacitor C2, the non-resonant capacitor C1 and the inductor L is electrically connected in series between the second voltage V2 and the ground voltage level; and the switches Q1~Q10 control the resonant capacitor C3 to be electrically connected in series to the inductor L via the switching node LX, and the series circuit formed by the resonant capacitor C3 and the inductor L is electrically connected in parallel to the second voltage V2. In this embodiment, the non-resonant capacitor C1, the resonant capacitor C2, and the resonant capacitor C3 operate together with the inductor L in resonant operation to execute power conversion between the first voltage V1 and the second voltage V2. In regard to operation details of the above-mentioned switches Q1~Q10, please refer to the embodiment shown in FIG. 2.

The control circuit 1201 and the zero current estimation circuit 1203 of this embodiment can be implemented by using the control circuit structure and the zero current estimation circuit structure of FIG. 2, FIG. 3 and FIG. 8; please refer to the detailed descriptions of FIG. 2, FIG. 3 and FIG. 8A. The resonant current IL1 freewheels in a way that is similar to that described with reference to FIG. 13 and FIG. 8A, and please refer to the detailed description of FIG. 13 and FIG. 8A.

The present invention provides a switched capacitor voltage converter circuit as described above, having advantages including: that, because the present invention can provide adaptive ON periods and adaptive delay periods, to cover size tolerance of the devices; and that, the present invention can minimize the delay period, to effectively reduce the consumed current and the conduction power loss; and that, because it is not required for the present invention to employ a current sensing resistor or a current sensing transformer, the present invention can reduce the power loss caused by a high current passing through the current sensing resistor and the present invention can solve the precision issue of using a current sensing resistor in a case where the current is a low current.

It should be understood that "high level" and "low level" mentioned in the above embodiments are only for illustration, but not for limiting the broadest scope of the present invention. In other embodiments, based on the type of switches and the required logic operation, the above-mentioned "high level" and "low level" may be modified as required, under the spirit of the present invention.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit configured to convert a first voltage into a second voltage or to convert the second voltage into the first voltage, the switched capacitor voltage converter circuit comprising:
   a switched capacitor converter coupled between the first voltage and the second voltage;
   a control circuit configured to generate a control signal for controlling the switched capacitor converter to convert the first voltage to the second voltage or to convert the second voltage to the first voltage; and
   a zero current estimation circuit, which is coupled to the switched capacitor converter;
   wherein the switched capacitor converter includes:
      at least one resonant capacitor;
      a plurality of switches coupled to the at least one resonant capacitor; and
      at least one inductor;
   wherein the zero current estimation circuit is coupled to the at least one inductor or to the at least one resonant capacitor, and the zero current estimation circuit is configured to estimate a time point at which a first resonant current is zero during a first process or estimate a time point at which at least one second resonant current is zero during at least one second process according to a voltage difference across two ends of the at least one inductor or according to a voltage difference across two ends of the at least one resonant capacitor, so as to correspondingly generate a zero current estimation signal at a time point which is not later than the time point at which the first resonant current is zero or at a time point which is not later than the time point at which the at least one second resonant current is zero, and the control signal is generated according to the zero current estimation signal;
   wherein the control signal generated by the control circuit includes: a first operation signal and at least one second operation signal;
   wherein, in the first process, the first operation signal controls a first portion of the plurality of switches, so that the at least one resonant capacitor and a corresponding one of the at least one inductor are connected in series between the first voltage and the second voltage, to form a first current path and to operate in a resonant operation mode;
   wherein, in the at least one second process, the at least one second operation signal controls a second portion of the plurality of switches, so that the at least one resonant capacitor and the corresponding one of the at least one inductor are connected in series between the second voltage and a DC potential, to simultaneously form or sequentially form a plurality of second current paths and operate in the resonant operation mode;
   wherein the first operation signals and the at least one second operation signals have respective ON periods which do not overlap one another, so that the first process and the at least one second process do not overlap each other;

wherein the first process and the at least one second process are performed in a repeated, alternating manner, so as to convert the first voltage into the second voltage or to convert the second voltage into the first voltage;

wherein the zero current estimation circuit includes:
  a voltage detection circuit, which is configured to generate a voltage detection signal according to the voltage difference across the two ends of the at least one inductor, wherein the voltage detection signal is indicative of a positive voltage period wherein the voltage difference across the two ends of the at least one inductor is above zero voltage; and
  a timer, which is coupled to an output end of the voltage detection circuit and which is configured to generate the zero current estimation signal according to the voltage detection signal;

wherein the timer includes:
  a ramp circuit, which is configured to generate a rising ramp of a ramp signal according to the voltage detection signal during the positive voltage period, and to generate a falling ramp of the ramp signal according to the rising ramp after the positive voltage period ends; and
  a comparison circuit, which is configured to compare the ramp signal with a zero current threshold, so as to generate the zero current estimation signal for determining a starting time point and an ending time point of the first process and a starting time point and an ending time point of the at least one second process;

wherein the ramp circuit includes:
  a boost circuit, which is configured to increase a voltage across a ramp capacitor from zero during the positive voltage period, so as to generate the rising ramp; and
  a buck circuit, which is configured to decrease the voltage across the ramp capacitor after the positive voltage period ends, so as to generate the falling ramp;
  wherein an absolute value of a slope of the rising ramp is the same as an absolute value of a slope of the falling ramp.

2. The switched capacitor voltage converter circuit of claim 1, wherein the zero current estimation circuit is configured to generate the zero current estimation signal at a time point which is earlier than the time point at which the first resonant current is zero or at a time point which is earlier than the time point at which the at least one second resonant current is zero, whereby the control signal is generated according to the zero current estimation signal.

3. The switched capacitor voltage converter circuit of claim 1, wherein the zero current estimation circuit is configured to generate the zero current estimation signal at a time point which is exactly the time point at which the first resonant current is zero or at a time point which is exactly the time point at which the at least one second resonant current is zero, whereby the control signal is generated according to the zero current estimation signal.

4. The switched capacitor voltage converter circuit of claim 1, wherein the at least one inductor includes: a first inductor and a second inductor, or wherein the at least one resonant capacitor includes: a first resonant capacitor and a second resonant capacitor, wherein the time point at which the first resonant current flows through the first inductor or through the first resonant capacitor is earlier than the time point at which the at least one second resonant current flows through the second inductor or through the second resonant capacitor, wherein the zero current estimation circuit is configured to generate the zero current estimation signal at the time point at which the first resonant current flowing through the first inductor or through the first resonant capacitor is zero, whereby the first operation signal and the at least one second operation signal are generated according to the zero current estimation signal.

5. The switched capacitor voltage converter circuit of claim 4, wherein when the control circuit controls the plurality of switches to be non-conductive according to the first operation signal and the at least one second operation signal at the time point at which the first resonant current flowing through the first inductor or through the first resonant capacitor is zero, the at least one second resonant current flowing through the second inductor or through the second resonant capacitor keeps freewheeling along a current freewheeling path, whereby the at least one second resonant current stops flowing toward the second voltage, or the at least one second resonant current flowing toward the second voltage is a linear ramp current.

6. The switched capacitor voltage converter circuit of claim 5, wherein a current variation speed of the linear ramp current is greater than a current variation speed of the first resonant current in the resonant operation mode and a current variation speed of the at least one second resonant current in the resonant operation mode.

7. The switched capacitor voltage converter circuit of claim 5, wherein after the linear ramp current decreases to zero or near zero, at least two of the plurality of switches are conductive, so as to execute the first process or the at least one second process.

8. The switched capacitor voltage converter circuit of claim 5, wherein after a time point when the linear ramp current has decreased for a delay period and earlier than a time point when the linear ramp current reaches zero, at least two of the plurality of switches are conductive, so as to execute the first process or the at least one second process.

9. The switched capacitor voltage converter circuit of claim 1, wherein the at least one inductor includes: a first inductor and a second inductor, or wherein the at least one resonant capacitor includes: a first resonant capacitor and a second resonant capacitor, wherein the time point at which the first resonant current flows through the first inductor or through the first resonant capacitor is earlier than the time point at which the at least one second resonant current flows through the second inductor or through the second resonant capacitor, wherein the zero current estimation circuit is configured to generate the zero current estimation signal at a time point which is earlier than the time point at which the first resonant current flowing through the first inductor or through the first resonant capacitor is zero, whereby the first operation signal and the at least one second operation signal are generated according to the zero current estimation signal.

10. The switched capacitor voltage converter circuit of claim 9, wherein when the control circuit controls the plurality of switches to be non-conductive according to the first operation signal and the at least one second operation signal at a time point which is earlier than the time point at which the first resonant current flowing through the first inductor or through the first resonant capacitor is zero, the first resonant current flowing through the first inductor keeps freewheeling along a corresponding current freewheeling path or the first resonant capacitor and the second resonant current flowing through the second inductor or the second resonant capacitor keeps freewheeling along a corresponding current freewheeling path, whereby the first resonant current and the at least one second resonant current both stop flowing toward the second voltage, or each of the first resonant current flowing toward the second voltage and the at least one second resonant current flowing toward the second voltage is a linear ramp current.

11. The switched capacitor voltage converter circuit of claim 1, further comprising:
a non-resonant capacitor coupled to a resonant capacitor of the at least one resonant capacitor, wherein a voltage across the non-resonant capacitor is kept as a constant DC voltage in the first process and in the at least one second process.

12. The switched capacitor voltage converter circuit of claim 1, wherein the boost circuit includes:
a first switch; and
a first current source;
wherein the first switch is configured to conduct the first current source to charge the ramp capacitor according to the voltage detection signal during the positive voltage period.

13. The switched capacitor voltage converter circuit of claim 12, wherein the buck circuit includes:
a second switch; and
a second current source;
wherein the second switch is configured to conduct the second current source to discharge the ramp capacitor after the positive voltage period ends.

14. The switched capacitor voltage converter circuit of claim 13, wherein the control circuit includes:
a switch control circuit, which is configured to generate the first operation signal and the at least one second operation signal according to the zero current estimation signal; and
a delay circuit, which is configured to maintain the zero current estimation signal for a delay period, so that the first process and the at least one second process are separated from each other by the delay period.

15. The switched capacitor voltage converter circuit of claim 14, wherein during the delay period, the plurality of switches are kept OFF.

16. The switched capacitor voltage converter circuit of claim 1, wherein the voltage detection circuit includes:
at least one comparator, which is configured to compare voltages at the two ends of the at least one inductor.

17. The switched capacitor voltage converter circuit of claim 16, wherein the at least one comparator includes two comparators, and the at least one inductor includes a first inductor and a second inductor, and wherein one of the two comparators is coupled to two ends of the first inductor, whereas, the other of the two comparators is coupled to two ends of the second inductor.

18. The switched capacitor voltage converter circuit of claim 1, wherein the timer adjusts a level to the zero current threshold to shorten or prolong a period of the zero current estimation signal.

19. The switched capacitor voltage converter circuit of claim 1, wherein the switched capacitor converter comprises a distributed switched capacitor converter, a series-parallel switched capacitor converter, a Dickson switched capacitor converter, a ladder switched capacitor converter, a pipelined switched capacitor converter, or a switched tank converter.

20. The switched capacitor voltage converter circuit of claim 19, wherein the series-parallel switched capacitor converter includes: a 2-to-1 series-parallel switched capacitor converter, a 3-to-1 series-parallel switched capacitor converter, or a 4-to-1 series-parallel switched capacitor converter.

21. The switched capacitor voltage converter circuit of claim 1, wherein the DC potential is ground potential.

22. A switched capacitor voltage converter circuit configured to convert a first voltage into a second voltage or to convert the second voltage into the first voltage, the switched capacitor voltage converter circuit comprising:
a switched capacitor converter coupled between the first voltage and the second voltage;
a control circuit configured to generate a control signal for controlling the switched capacitor converter to convert the first voltage to the second voltage or to convert the second voltage to the first voltage; and
a zero current estimation circuit, which is coupled to the switched capacitor converter;
wherein the switched capacitor converter includes:
at least one resonant capacitor;
a plurality of switches coupled to the at least one resonant capacitor; and
at least one inductor;
wherein the zero current estimation circuit is coupled to the at least one inductor or to the at least one resonant capacitor, and the zero current estimation circuit is configured to estimate a time point at which a first resonant current is zero during a first process or estimate a time point at which at least one second resonant current is zero during at least one second process according to a voltage difference across two ends of the at least one inductor or according to a voltage difference across two ends of the at least one resonant capacitor, so as to correspondingly generate a zero current estimation signal at a time point which is not later than the time point at which the first resonant current is zero or at a time point which is not later than the time point at which the at least one second resonant current is zero, and the control signal is generated according to the zero current estimation signal;
wherein the control signal generated by the control circuit includes: a first operation signal and at least one second operation signal;
wherein, in the first process, the first operation signal controls a first portion of the plurality of switches, so that the at least one resonant capacitor and a corresponding one of the at least one inductor are connected in series between the first voltage and the second voltage, to form a first current path and to operate in a resonant operation mode;
wherein, in the at least one second process, the at least one second operation signal controls a second portion of the plurality of switches, so that the at least one resonant capacitor and the corresponding one of the at least one inductor are connected in series between the second voltage and a DC potential, to simultaneously form or sequentially form a plurality of second current paths and operate in the resonant operation mode;
wherein the first operation signals and the at least one second operation signals have respective ON periods which do not overlap one another, so that the first process and the at least one second-process do not overlap each other;
wherein the first process and the at least one second process are performed in a repeated, alternating manner, so as to convert the first voltage into the second voltage or to convert the second voltage into the first voltage;

wherein the zero current estimation circuit includes:
- a voltage detection circuit, which is configured to generate a voltage detection signal according to the voltage difference across the two ends of the at least one inductor, wherein the voltage detection signal is indicative of a positive voltage period wherein the voltage difference across the two ends of the at least one inductor is above zero voltage; and
- a timer, which is coupled to an output end of the voltage detection circuit and which is configured to generate the zero current estimation signal according to the voltage detection signal;

wherein the timer includes:
- a counter circuit; and
- a determination circuit;
- wherein when the voltage detection signal is switched from low level to high level, the counter circuit starts counting according to a clock signal and outputs a counting result to the determination circuit, and wherein when the voltage detection signal is switched from the high level to the low level, the counter circuit counts down from a last counting result according to the clock signal; wherein when the counter circuit counts down to zero or to a counting threshold, the determination circuit generates the zero current estimation signal; and wherein after the determination circuit generates the zero current estimation signal, the determination circuit outputs a reset signal to the counter circuit, so as to reset the counter circuit.

* * * * *